United States Patent
Bi et al.

(10) Patent No.: US 12,360,916 B2
(45) Date of Patent: Jul. 15, 2025

(54) MEMORY SYSTEMS AND METHODS OF OPERATING THEREOF, MEMORY CONTROLLERS AND READABLE STORAGE MEDIA

(71) Applicant: Yangtze Memory Technologies Co., Ltd., Hubei (CN)

(72) Inventors: Fanya Bi, Hubei (CN); Xing Wang, Hubei (CN); Hua Tan, Hubei (CN); Zhe Sun, Hubei (CN); Bo Yu, Hubei (CN); Guangyao Han, Hubei (CN)

(73) Assignee: Yangtze Memory Technologies Co., Ltd., Wuhan (CN)

(*) Notice: Subject to any disclaimer, the term of this patent is extended or adjusted under 35 U.S.C. 154(b) by 111 days.

(21) Appl. No.: 18/472,210

(22) Filed: Sep. 21, 2023

(65) Prior Publication Data
US 2024/0362169 A1 Oct. 31, 2024

(30) Foreign Application Priority Data
Apr. 28, 2023 (CN) .......................... 202310503356.6

(51) Int. Cl.
  G06F 12/10    (2016.01)
  G06F 12/0873  (2016.01)
  G06F 12/1018  (2016.01)

(52) U.S. Cl.
  CPC ...... *G06F 12/1018* (2013.01); *G06F 12/0873* (2013.01)

(58) Field of Classification Search
  None
  See application file for complete search history.

(56) References Cited

U.S. PATENT DOCUMENTS

2020/0159446 A1* 5/2020 Alsasua .................. G11C 7/04

* cited by examiner

*Primary Examiner* — Scott C Sun
(74) *Attorney, Agent, or Firm* — HANLEY, FLIGHT & ZIMMERMAN, LLC

(57) ABSTRACT

An example memory controller and readable storage medium are disclosed. An example memory system includes: a non-volatile memory device and a memory controller coupled to the non-volatile memory device; the memory controller is configured to: determine whether data for the logical block address mapping of a received read command belongs to tables of a first class or tables of a second class, and confirm the heat of the data corresponding to the logical block address of the received read command; determine a level of the amount of drift of a threshold voltage of a memory cell corresponding to the logical block address, according to the heat of the data corresponding to the logical block address of the received read command; determine different read voltages that are correspondingly sent to the memory cell corresponding to the logical block address, according to different levels of the amount of drift.

20 Claims, 7 Drawing Sheets

MEMORY SYSTEMS AND METHODS OF OPERATING THEREOF, MEMORY CONTROLLERS AND READABLE STORAGE MEDIA

CROSS-REFERENCE TO RELATED APPLICATION

This application claims priority to and the benefit of Chinese Patent Application 202310503356.6, filed on Apr. 28, 2023, which is hereby incorporated by reference in its entirety.

TECHNICAL FIELD

Example of the present disclosure relate to the field of semiconductor technology, and in particular to a memory system and a method of operating thereof, a memory controller and a readable storage medium.

BACKGROUND

The threshold voltage of a memory cell of a non-volatile memory device drifts over time, and a time range for a drift of a threshold voltage is very large, thus it is difficult to track the levels of the drift of threshold voltages of memory cells corresponding to the logical block addresses of all data, and in turn, it is difficult to guarantee the reliability of the read voltage, resulting errors in the read data, and the reliability of the read data may not be guaranteed.

DETAILED DESCRIPTION

Figure 1:
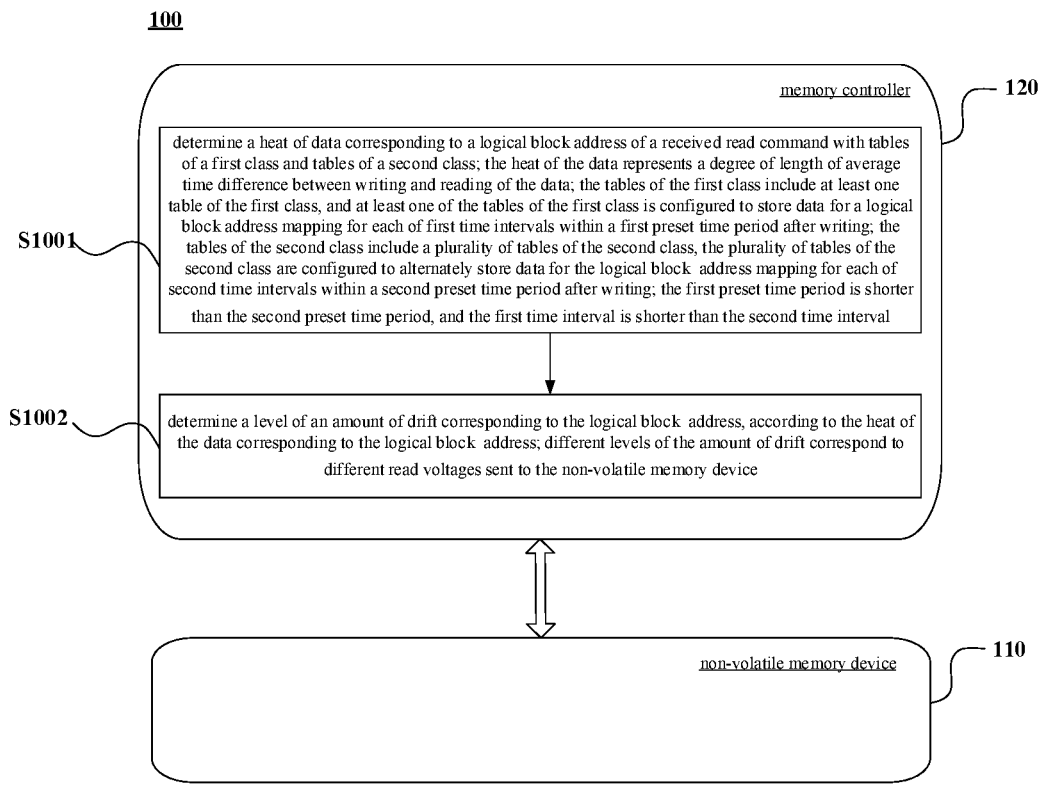
FIG. 1 is a block diagram of a memory system provided by an example of the present disclosure.

The technical schemes in implementations of the present disclosure will be clearly and completely described below in conjunction with the implementations and accompanying drawings, and the described implementations are only some, not all of implementations of the present disclosure. All other implementations obtained by those skilled in the art based on the implementations in the present disclosure without any creative efforts belong to the claimed scope of the present disclosure.

In the following description, numerous specific details are given in order to provide a more thorough understanding of the present disclosure. However, it will be apparent to one skilled in the art that the present disclosure may be practiced without one or more of these details. In other examples, in order to avoid confusion with the present disclosure, some technical features known in the art are not described; i.e., not all features of the actual example are described here, and well-known functions and structures are not described in detail.

In the accompanying drawings, size of a layer, a region, an element and their relative sizes may be exaggerated for clarity. Like reference numerals refer to like elements throughout the disclosure.

It will be understood that when an element or layer is referred to as being "on." "adjacent to," "connected to" or "coupled to" another element or layer, it may be directly on, adjacent to, connected to or coupled to another element or layer, or intervening elements or layers may be present. In contrast, when an element is referred to as being "directly on." "directly adjacent to," "directly connected to" or "directly coupled to" another element or layer, no intervening elements or layers may be present. It will be understood that, although the terms "first", "second", "third" etc., may be used to describe various elements, components, regions, layers and/or parts, these elements, components, regions, layers and/or parts should not be limited by these terms. These terms are only used to distinguish one element, component, region, layer or part from another element, component, region, layer or part. Thus, a first element, component, region, layer or part discussed below may be represented as a second element, component, region, layer or part without departing from teachings of the present disclosure. Whereas a second element, component, region, layer or part is discussed, it does not indicate that a first element, component, region, layer or part must be presented in the present disclosure.

The terms of spatial relationship such as "beneath", "below", "lower", "under", "above", "on", etc., may be used herein for case of description to describe the relationship of one element or feature with another element(s) or feature(s) as illustrated in the figures. It will be understood that the terms of spatial relationship are intended to encompass different orientations of the device in use or operations in addition to the orientation depicted in the figures. For example, if the device in the figures is turned over, an element or a feature described as "below" or "beneath" or "under" another element or feature would then be oriented "above" the another element or feature. Thus, in examples, the terms "below" and "under" may encompass both directions of up and down. A device may be otherwise oriented (rotated 90 degrees or at other orientations) and the terms of spatial relationship used herein should be interpreted accordingly.

A term used herein is for the purpose of describing an example only and is not to be considered as limitation of the present disclosure. As used herein, the singular forms "a", "an" and "said/the" are intended to include the plural forms as well, unless the context clearly dictates otherwise. It should also be understood that the terms "consists of" and/or "including", when used in this description, is to identify the presence of stated features, integers, operations, steps, elements and/or parts, but do not exclude the presence or addition of one or more other features, integers, operations, steps, elements, parts and/or groups. As used herein, the term "and/or" includes any and all combinations of the associated listed items.

In order to thoroughly understand the present disclosure, detailed operations and detailed structures will be provided in the following description, so as to explain the technical scheme of the present disclosure. Examples of the present disclosure are described in detail as follows, however, the present disclosure may have other examples other than these detailed descriptions.

FIG. 1 is a block diagram of a memory system provided by an example of the present disclosure. As shown in FIG. 1, according to a first aspect of an example of the present disclosure, a memory system is provided, the memory system 100 includes: at least one non-volatile memory device 110 and a memory controller 120 coupled to the non-volatile memory device; the memory controller 120 is configured to perform the following operations:

Operation S1001. determining a heat of data corresponding to a logical block address of a received read command with tables of a first class and tables of a second class; the heat of the data represents a degree of length of average time difference between writing and reading of data; the tables of the first class include at least one table of the first class, and at least one of the tables of the first class is configured to store data for a logical block address mapping for each of the first time intervals within a first preset time period after writing; the tables of the second class include a plurality of tables of the second class, the plurality of tables of the second class are configured to alternately store data for the logical block address mapping for each of the second time intervals within a second preset time period after writing; the first preset time period is shorter than the second preset time period, and the first time interval is shorter than the second time interval;

Operation S1002. determining a level of an amount of drift corresponding to the logical block address according to the heat of the data corresponding to the logical block address; different levels of the amount of drift correspond to different read voltages sent to the non-volatile memory device.

The memory system 100 includes at least one memory and a memory controller connected to the at least one memory. The memory may include a non-volatile memory device and a volatile memory device.

The memory controller 120 may control the overall operation of the memory system 100. The memory controller 120 may store data to a non-volatile memory device, or may read data stored in a non-volatile memory device.

The non-volatile memory device 110 may include one of Phase Change Memory (PCM), Resistive Random Access Memory (RRAM), Magnetoresistive Random Access Memory (MRAM) and Nantero's CNT Random Access Memory (NRAM).

The memory controller 120 may also store various information required for the operation of the memory system 100 (e.g., metadata information and a mapping table) to the volatile memory device, and may access the non-volatile memory device based on information stored in the volatile memory device.

Volatile memory device may include Dynamic Random-Access Memory (DRAM), Static Random-Access Memory (SRAM), Synchronous Dynamic Random-Access Memory (SDRAM) or Double-Data-Rate Fourth Generation Synchronous Dynamic Random Access Memory (DDR4 SDRAM).

The table of the first class and the table of the second class may be mapping tables (TBLs) that provide an insertion operation and a lookup operation for the memory system in a fast and efficient way. The first preset time period and the second preset time period may respectively be ranges of time periods formed by at least one first time interval and at least one second time interval, respectively, which may correspond to different degrees of the heat of data. Wherein, the first time interval and the second time interval may respectively correspond to different time intervals sent by a time interval trigger. In some examples, within the first preset time period, the tables of the first class are configured to store data for the logical block address mapping triggered by the first time interval, and within the second preset time period, the tables of the second class are configured to store data for the logical block address mapping triggered by the second time interval; the first time interval is less than the second time interval.

In some examples, the second time interval includes the first time interval; wherein, within the second time interval, data for the logical block address mapping triggered by the second time interval includes data for the logical block address mapping triggered by the first time interval, the table of the second class includes the table of the first class.

The heat of the data may represent a degree of length of average time difference between the writing and reading of data to and from non-volatile storage (hereinafter referred to as the average time difference between writing and reading). In some examples, data may be classified into hot data, warm data and cold data according to the time difference between writing and reading of data. The time difference between writing and reading corresponding to the hot data is the shortest one, the time difference between writing and reading corresponding to the warm data is the second one, and the time difference between writing and reading corresponding to the cold data is the longest one; wherein the time difference between writing and reading which corresponds to the hot data, the warm data, and the cold data respectively becomes longer in sequence.

For example, the average time difference between writing and reading of the hot data may be defined as 1 μs~2 ms, which may be referred to hot data (1 μs~2 ms) hereinafter; the average time difference between writing and reading of the warm data may be defined as 1 ms~2 s, which may be referred to warm data (1 ms~2 s) hereinafter; the average time difference between writing and reading of the cold data may be defined as 1 s~several hours, which may be referred to cold data (1 s~several hours) hereinafter.

It is to be noted that ranges of time differences between writing and reading of the hot data, the warm data and the cold data may overlap, for the data of which the time difference between writing and reading is in a non-overlapping region, the result for the determination of the heat of the data is unique. In some examples, for the data of which time difference between writing and reading is in a range of 1 microsecond to 1 millisecond, the data may be determined as hot data; or for the data of which time difference between writing and reading is in a range of 2 milliseconds to 1 second, the data may be determined as warm data; for the data of which time difference between writing and reading is over 2 seconds, the data may be determined as cold data. However, for the data of which time difference between writing and reading is in an overlapping region, the result for the determination of the heat of the data is not unique. In some examples, for the data of which time difference between writing and reading is in a range of 1 millisecond to 2 milliseconds, the data may be determined as either hot data or warm data. For the data of which time difference between writing and reading is in a range of 1 second to 2 seconds, the data may be determined as either warm data or cold data. Therefore, the heat of data represents a degree of length of average time difference between writing and reading of data.

It is to be understood that if there are overlapping regions among ranges of time differences between writing and reading of the hot data, the warm data and the cold data, these overlapping regions are all located at the intersection of the two classes of data. However, there is actually a certain window for the read voltage, and for the data in the overlapping region, the two levels of the amount of drift corresponding to the two types of data may be applicable, at this point, the read voltage corresponding to the two levels of the amount of drift may also be applicable.

Here and below, logical block address (LBA) corresponding to a hot data, a warm data, and a cold data are referred to as a hot logical block address, a warm logical block address, and a cold logical block address, respectively.

It is to be noted that, here and below, the data for the logical block address mapping refers to the data representing the logical block address, which may be the logical data itself or the data which may represent the logical block address and is obtained after logical operation (or mapping function operation) is performed on the logical block address.

By performing operation S1001, the memory controller may use at least one table of a first class to store data for the hot logical block address mapping, and use a plurality of tables of a second class to alternately store data for the warm logical block address mapping.

The memory controller may determine whether data for the logical block address mapping of a received read command belongs to a table of the first class or a table of the second class, and confirm the heat of the data corresponding to the logical block address of the received read command according to the result for the determination. In some examples, data for the logical block address mapping of a received read command belongs to a table of the first class, then it is confirmed that the heat of the data corresponding to the logical block address of the received read command is hot, i.e., it is confirmed that the data corresponding to the logical block address of the received read command is hot data, or it is confirmed that the logical block address of the received read command is a hot logical block address.

The memory controller uses at least one table of the first class to store data for the hot logical block address mapping, which may improve or solve the problem that a read window margin (RWM) of the non-volatile memory device is very small at time zero.

Whereas warm data and cold data have a relatively large RWM. The memory controller uses a plurality of tables of the second class to alternately store data for the warm logical block address mapping, and may distinguish between massive warm data and cold data having relatively large RWM at low latency.

Since the threshold voltage of the memory cell of the non-volatile memory device drifts over time, the levels of the amount of drift for the threshold voltage may be divided into different levels according to different heat of data (e.g., hot, warm and cold).

By performing operation S1002, the memory controller may determine the level of the amount of drift of the threshold voltage of the memory cell corresponding to the logical block address according to the heat of the data corresponding to the logical block address of the received read command; determine the different read voltages correspondingly sent to the non-volatile memory device 110 corresponding to the logical block address according to different levels of the amount of drift. That is, the heat of the data in the memory cell corresponding to the logical block address of the received read command is different, given the corresponding read voltage, each drift level with the corresponding read voltage may give a promised Raw Bit Error Rate (RBER), thereby ensuring the reliability of reading of data.

In an example of the present disclosure, the memory controller is configured to: determine whether data for the logical block address mapping of a received read command belongs to a table of a first class or a table of a second class, and confirm the heat of the data corresponding to the logical block address according to the result for the determination; determine a level of the amount of drift corresponding to the logical block address according to the heat of the data corresponding to the logical block address; determine the read voltage applied during the reading of the data corresponding to the corresponding logical block address in the non-volatile memory device according to the level of the amount of drift, so as to compensate the drift of the threshold voltage of the memory cell over time, thereby ensuring the reliability of reading of data from the non-volatile memory device.

Referring to FIGS. 1, 2A, 2B, 3A, 3B, 4A, 4B, 5A and 5B described above, it will be described in detail how the memory controller to determine the heat of the data corresponding to the logical block address of the received read command with the tables of the first class and the tables of the second class in the following. In the following text and drawings, hot data may be understood as data for the hot logical block address mapping, warm data may be understood as data for the warm logical block address mapping, and cold data may be understood as data for the cold logical block address mapping.

It is to be noted that in the following, hot data: 1 μs~2 ms, warm data: 1 ms~2 s, and cold data: 1 s~several hours are used as the basis for the classification of heat of data as an example for description, it may be understood that the basis for the classification of heat of data here is only for simplifying description, and not for limiting the basis for the classification of heat of data in the present disclosure. In other examples, the classification of heat of data may be based on other ways.

Figure 2A:
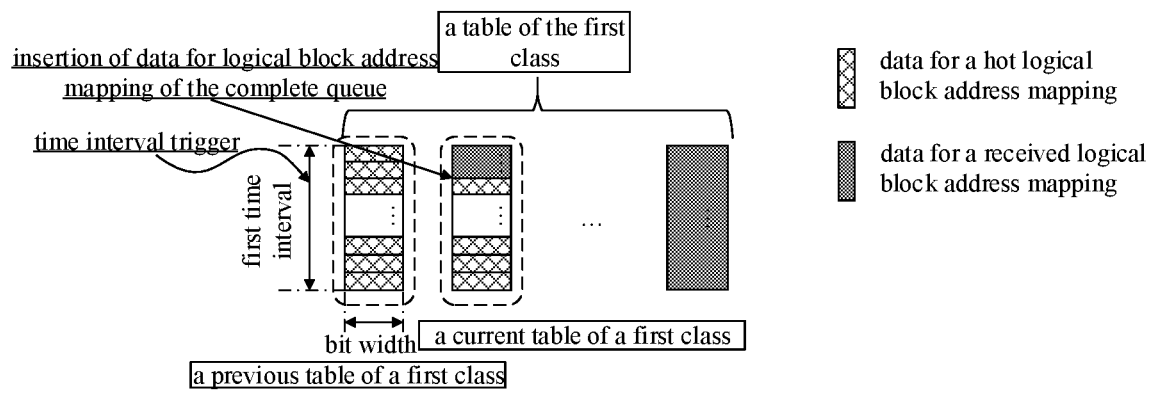
FIGS. 2A and 2B are block diagrams of structures of a table of a first class and a table of a second class for a memory system provided by an example of the present disclosure.
Figure 2B:
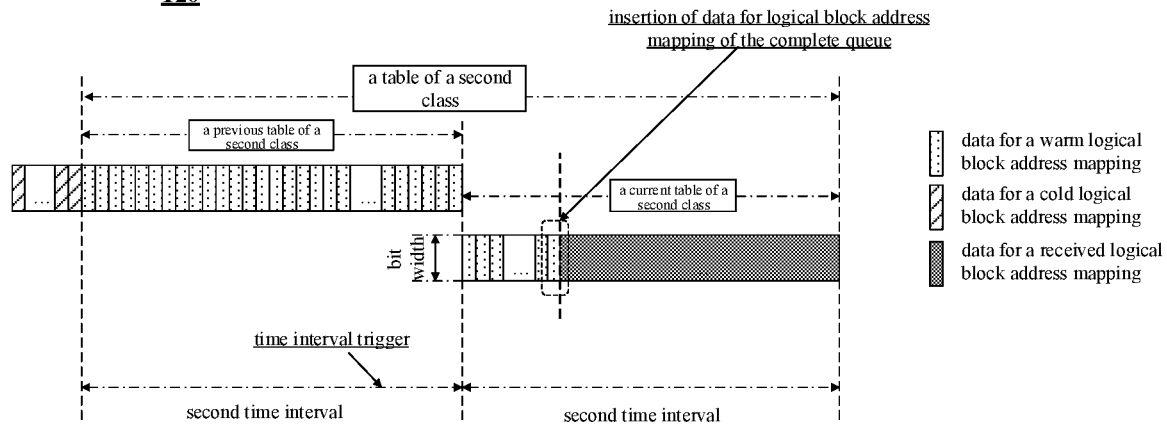

FIGS. 2A and 2B are block diagrams of structures of a table of a first class and a table of a second class for a memory system provided by an example of the present disclosure. As shown in FIGS. 2A and 2B, in some examples, the tables of the first class are obtained through a Hash table; the tables of the second class are obtained through a Bloom Filter, Cuckoo Filter, XOR Filter, Vacuum Filter.

Here, the Hash table may include a first mapping function and a table of a first class, and the Bloom filter and so on, may include a second mapping function and a table of a second class. The data for the logical block addresses mapped through the first mapping function within the first preset time period after the host writing is stored in the table of the first class. The data for the logical block addresses mapped through the second mapping function within the second preset time period after the host writing is stored in the table of the second class.

In some examples, the table of the first class is configured to store data for the logical block address mapping triggered by the first time interval, and the tables of the second class are configured to store data for the logical block address mapping triggered by the second time interval; the first time interval is less than the second time interval; wherein, within the second time interval, data for the logical block address mapping triggered by the second time interval includes data for the logical block address mapping triggered by the first time interval, the table of the second class includes the table of the first class.

In this example, the table of the first class is a part of the table of the second class, and the storage space of a table of a first class triggered by the first time interval corresponds to one unit of storage space in the storage space of a table of a second class triggered by the second time interval. The storage space of a plurality of tables of the first class constitute storage space of one table of the second class. In some examples, the storage space of 1000 tables of the second class triggered at 1 ms time interval corresponds to the storage space of one table of the second class triggered at 1 Sec time interval.

In some examples, the table of the first class may be obtained through a Hash table, and the table of the second class may be obtained through a Bloom filter. In some examples, the data obtained through performing an operation of a Hash function on the logical block address is stored in the tables of the first class, and the tables of the first class are configured to store the data for hot the logical block address mapping; the data obtained through performing a plurality of operations of unbiased Hash function on the logical block address is stored in the tables of the second class, and the tables of the second class are configured to store the data for the warm logical block address mapping.

As shown in FIG. 2A, the tables of the first class are configured to store data for the hot logical block address mapping.

In some examples, the tables of the first class may include N mapping tables, where N is a positive integer and the maximum value is 5. Here, the value of N depends on the latency of insertion of the Bloom filter.

In some examples, the tables of the first class may include two mapping tables: a current table of the first class and a previous table of the first class. The current table of the first class is a table of the first class in which some part of storage space stores data for the logical block address mapping and other part of the storage space is unused, or a table of a first class that all of the storage space is unused just after being cleared. The previous table of the first class is a table of a first class in which data for the logical block address mapping takes up all of the storage space at the current time.

It is to be noted that the current table of the first class and the previous table of the first class store data alternately in time, and the current table of the first class and the previous table of the first class are not two tables of the first class at fixed physical locations, and the concepts of "current" and "previous" will change alternately over time. In some examples, at a certain current moment, a previous table of the first class is full of the data for the logical block address mapping, and a current table of the first class at a certain current time is storing the data for the logical block address mapping, and when the current table of the first class is fully stored, the previous table of the first class is cleared. The cleared previous table of the first class is used as the current table of the first class at a next current time, and the current table of the first class that has been fully stored before a certain current moment is used as the previous table of the first class at the next current moment.

wherein, the data for the logical block address mapping of the complete queue may be part of the input data for the logical block address mapping which is the data for the logical block address mapping to be inserted into the tables of the first class or the tables of the second class. For the definition and application of the input data for the logical block address mapping, please refer to the description of the relevant parts in FIG. 6 to FIG. 8 below, which will not be repeated here.

In some examples, each mapping table may be obtained through a time interval trigger. In some examples, a time interval trigger of 1 ms triggers to form multiple storage spaces with bit width of 31 bits.

As shown in FIG. 2B, the table of the second class is configured to store data for the warm logical block address mapping.

In some examples, the tables of the second class may include multiple mapping tables.

In some examples, the tables of the second class may include two mapping tables: the current table of the second class and the previous table of the second class. The method of inserting data for the logical block address mapping in the complete queue into the current table of the second class and the previous table of the second class, and the specific details of the current table of the second class and the previous table of the second class storing data alternately in time are similar to the situation of the current table of the first class and the previous table of the first class, and will not be repeated here. The difference is that the storage space for the tables of the second class is greater than those for the tables of the first class, and the trigger time intervals for the tables of the second class are greater than those for the tables of the first class. In some examples, the storage space of a table of a second class triggered by the second time interval is greater than the storage space of a table of a first class triggered by the first time interval.

In some examples, each mapping table may be obtained through a time interval trigger. In some examples, a time interval trigger of 1 Sec triggers to form multiple storage spaces with bit width of 31 bits.

Wherein, storage space of a unit in the tables of the second class is equivalent to the storage space of one table of the first class. In some examples, storage space of a unit in the current table of the second class as shown in FIG. 2B is equivalent to a storage space of the table of the first class as shown in FIG. 2A.

The table of the first class may be configured to store the data for the hot logical block address mapping with a very small RWM at time zero, the hot logical block address is stored by using a Hash table; the problem that the RWM of the non-volatile memory device is very small at time zero may be improved or solved.

The table of the second class may be configured to store a large amount of data for the warm logical block address mapping and data for the cold logical block address mapping, and the large amount of warm logical block addresses and cold logical block addresses are stored by using a Bloom filter, and the large amount of warm data and cold data may be distinguished with low latency, so that the warm data and cold data have a relatively large RWM.

Since the space for storing these warm data and cold data addresses is huge, it is impossible to use a Hash table to store all of these data for the logical block address mapping, e.g., querying a large amount of data for the warm logical block address mapping on the Hash table consumes a long time, causes a large latency of reading and increases the time consumed for refreshing or inserting of the Hash table.

If a certain rate of error recognition is allowed, compared with the scheme of querying a large amount of logical block addresses on the hash table, the scheme of querying a large amount of logical block addresses on the mapping table obtained by the Bloom filter has the advantages of comprehensive space efficiency and speed efficiency.

In some examples, when a 4 KB write granularity is used for Bloom filter implementation, the efficiency of the memory is increased by 20 times; the overhead of storing 1 Sec write address may be reduced from 1.84 MB (Hash table) to 92 KB (Bloom filter); and the time for querying a key on a Bloom filter is about ~40 ns.

By employing the scheme of querying a large amount of logical block addresses on the mapping table obtained by the Bloom filter, a large amount of logical block addresses may be stored, the storage size of the on-chip memory may be actively compressed, and the resource consumption of the on-chip memory may be avoided; meanwhile, fast and efficient insertion and search operations may be implemented and logical block addresses with any length may also be covered.

Figure 3A:
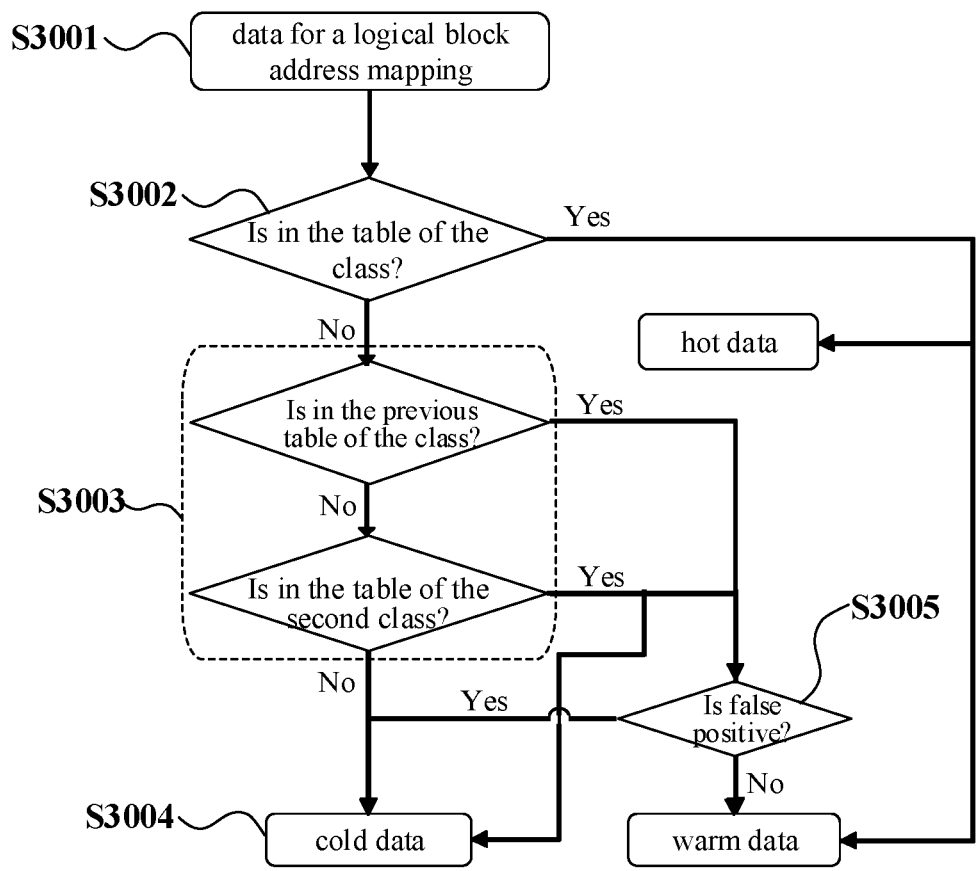
FIGS. 3A and 3B are a flow chart of a method of operating a memory system and a heat distribution diagram of data for the memory system, as provided by an example of the present disclosure.
Figure 3B:
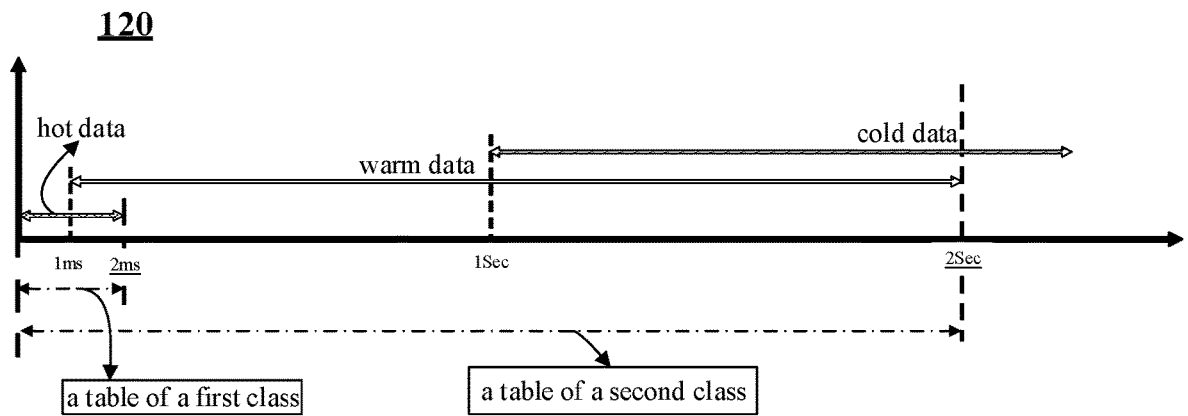

FIGS. 3A and 3B are flow chart and heat distribution diagram of data of a method of operating a memory system provided by an example of the present disclosure. As shown in FIGS. 3A and 3B, in some examples, the heat of the data includes: hot data, warm data, and cold data; the average time difference between writing and reading which corresponds to the hot data, the warm data, and the cold data respectively becomes longer in sequence; in some examples, the memory controller 120 is configured to perform the following operations:

Operation S3002. when the data for the logical block address mapping is in the tables of the first class, determine that the data corresponding to the logical block address is the hot data or warm data;

Operation S3003. when the data for the logical block address mapping is not in the tables of the first class, but in the tables of the second class, determine that the data corresponding to the logical block address is the warm data or cold data;

Operation S3004. when the data for the logical block address mapping is not in the tables of the first class nor the tables of the second class, determine that the data corresponding to the logical block address is the cold data.

Referring to FIGS. 3A and 3B, in some examples, a plurality of tables of the second class and one table of the first class are configured to write data for the logical block address mapping into a complete queue.

The table of the first class may store data for the hot logical block address mapping or data for the warm logical block address mapping; the table of the second class may store data for the hot logical block address mapping, data for the warm logical block address mapping, or data for the cold logical block address mapping; a logical block address that is not stored in the tables of the first class or the tables of the second class is a cold logical block address.

When data for the logical block address mapping may be queried from the table of the first class, the logical block address is a hot logical block address or a warm logical block address; otherwise, a plurality of tables of the second class are queried, and if data for the logical block address mapping may not be queried from the a plurality of tables of the second class, the logical block address is a cold logical block address, and if the data for the logical block address mapping may be queried from the two tables of the second class, the logical block address is a cold logical block address or a warm logical block address.

Figure 4A:
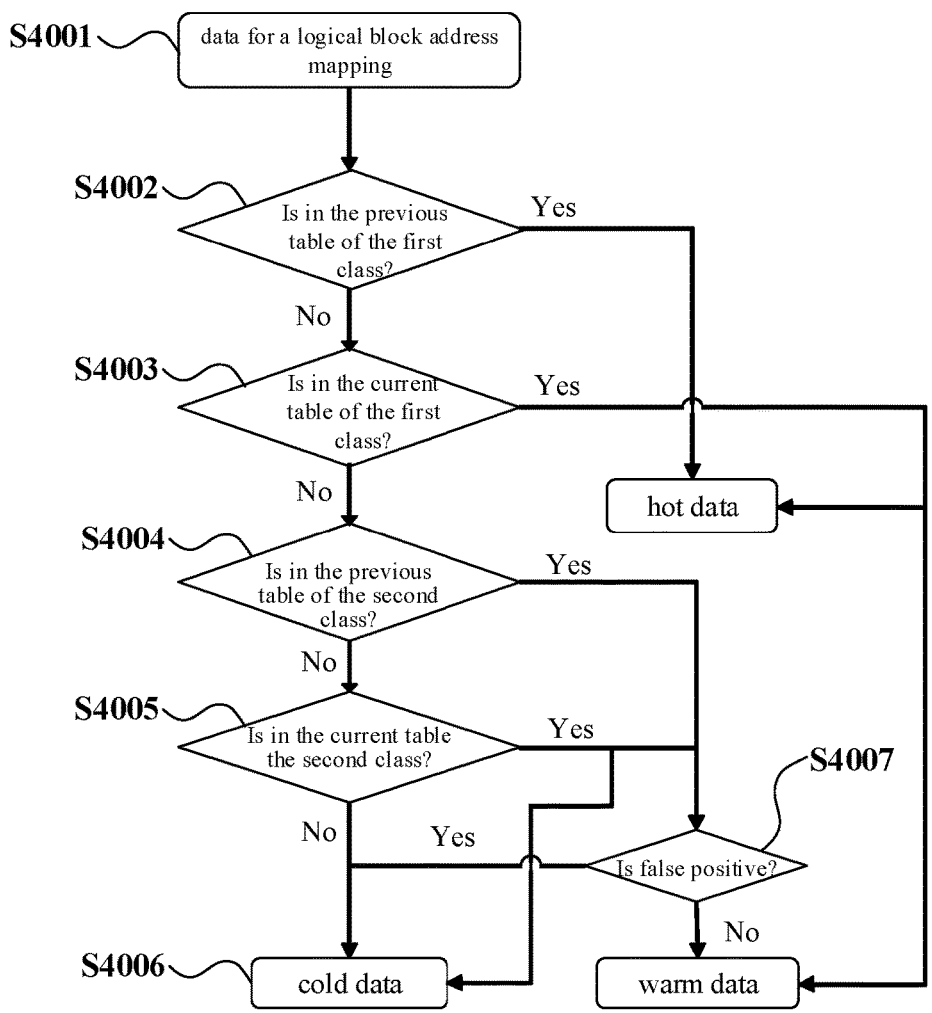
FIGS. 4A and 4B are a flow chart of a method of operating another memory system and a heat distribution diagram of data for another memory system, as provided by an example of the present disclosure.
Figure 4B:
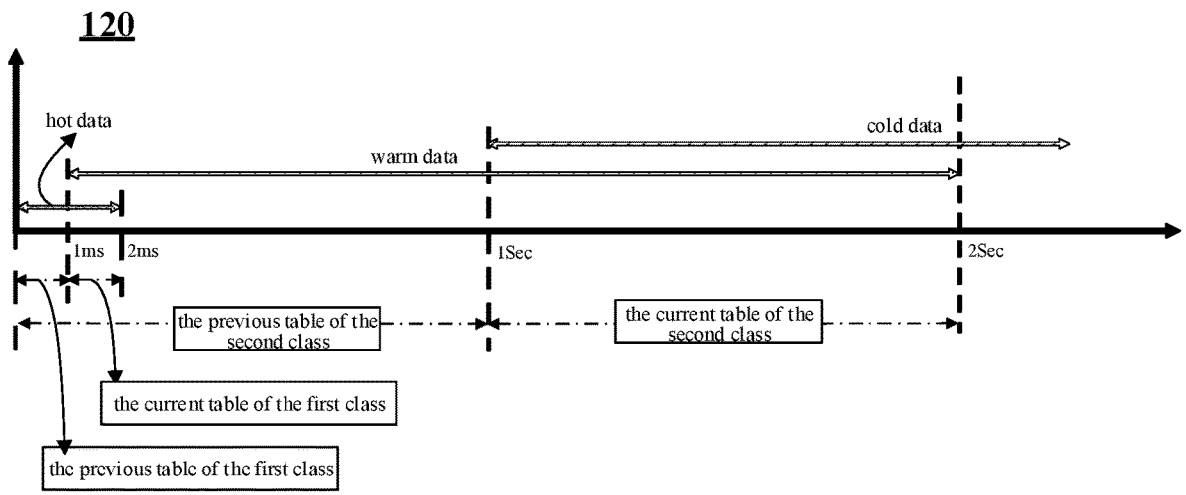

FIG. 4A and FIG. 4B are flow chart and heat distribution diagram of data of another method for operating a memory system provided by an example of the present disclosure. As shown in FIGS. 4A and 4B, in some examples, the number of tables of the first class includes two, and the number of tables of the second class includes two;

In some examples, the memory controller 120 is configured to perform the following operations:

Operation S4002. when the data for the logical block address mapping is in the table of the first class for the previous first time interval, determine that the data corresponding to the logical block address is the hot data;

Operation S4003. when the data for the logical block address mapping is not in the table of the first class for the previous first time interval, but in the table of the first class for the current first time interval, determine that the data corresponding to the logical block address is the hot data or warm data;

Operation S4004. when the data for the logical block address mapping is not in the table of the first class for the current first time interval nor the table of the first class for the previous first time interval, but in the table of the second class for the previous second time interval, determine that the data corresponding to the logical block address is the warm data;

Operation S4005. when the data for the logical block address mapping is not in any of the table of the first class for the current first time interval, the table of the first class for the previous first time interval, or the table of the second class for the previous second time interval, but in the table of the second class for the current second time interval, determine that the data corresponding to the logical block address is the warm data or cold data;

Operation S4006. when the data for the logical block address mapping is not in any of the table of the first class for the current first time interval, the table of the first class for the previous first time interval, or the table of the second class for the current second time interval, the table of the second class for the previous second time interval, determine that the data corresponding to the logical block address is the cold data.

Referring to FIGS. 4A and 4B, in some examples, two tables of the second class and two table of the first class are configured to alternately write data for the logical block address mapping into the complete queue.

The previous table of the first class may store data for the hot logical block address mapping, the current table of the first class may store data for the hot logical block address mapping or data for the warm logical block address mapping; the previous table of the second class may store data for the hot logical block address mapping or data for the warm logical block address mapping, the current table of the second class may store data for the warm logical block address mapping, or data for the cold logical block address mapping; a logical block address that is not stored in the tables of the first class or the tables of the second class is a cold logical block address.

In some examples, each of the tables of the second class is configured to store data for the logical block address mapping with a granularity of 1 Sec and a bit width of 31 bits, which is referred to a table of a second class with a granularity of 1 Sec hereinafter. Each of the tables of the first class is configured to store data for the logical block address mapping with a granularity of 1 ms and a bit width of 31 bits, which is referred to a table of a first class with a granularity of 1 ms hereinafter.

When the data for the logical block address mapping may be queried from the previous table of the first class with 1 ms granularity, the logical block address is a hot logical block address;

when the data for the logical block address mapping may not be queried from the previous table of the first class with 1 ms granularity but may be queried from the current table of the first class with 1 ms granularity, the logical block address is a hot logical block address or a warm logical block address;

when the data for the logical block address mapping may not be queried from the two table of the first class with 1 ms granularity, but may be queried from the previous table of the second class with 1 Sec granularity, the logical block address is a warm logical block address;

when the data for the logical block address mapping may not be queried from the two table of the first class with 1 ms granularity or be queried from the previous table of the second class with 1 Sec granularity, but may be queried from the current table of the second class with 1 Sec granularity, the logical block address is a warm logical block address or a cold logical block address;

when the data for the logical block address mapping may not be queried from the two table of the first class with 1 ms granularity or be queried from the two tables of the second class with 1 Sec granularity, the logical block address is a cold logical block address.

In some examples, the time interval range corresponding to the hot data and the time interval range corresponding to the warm data are provided with an overlapping range, and the time interval range corresponding to the warm data and the time interval range corresponding to the cold data are provided with an overlapping range; and a margin for the memory controller to determine the heat of data corresponding to the logical block address of the received read command is increased.

In some examples, referring to FIG. 4B, the time interval range corresponding to the hot data is 1 μs~2 ms, the time interval range corresponding to the warm data is 1 ms~2 Ses, and the time interval range corresponding to the cold data is greater than 2 Ses; wherein, the time interval range corresponding to the hot data and the time interval range corresponding to the warm data have an overlapping range of 1 ms~2 ms, and the time interval range corresponding to the warm data and the time interval range corresponding to the cold data have an overlapping range of 1 Ses~2 Ses.

Figure 5A:
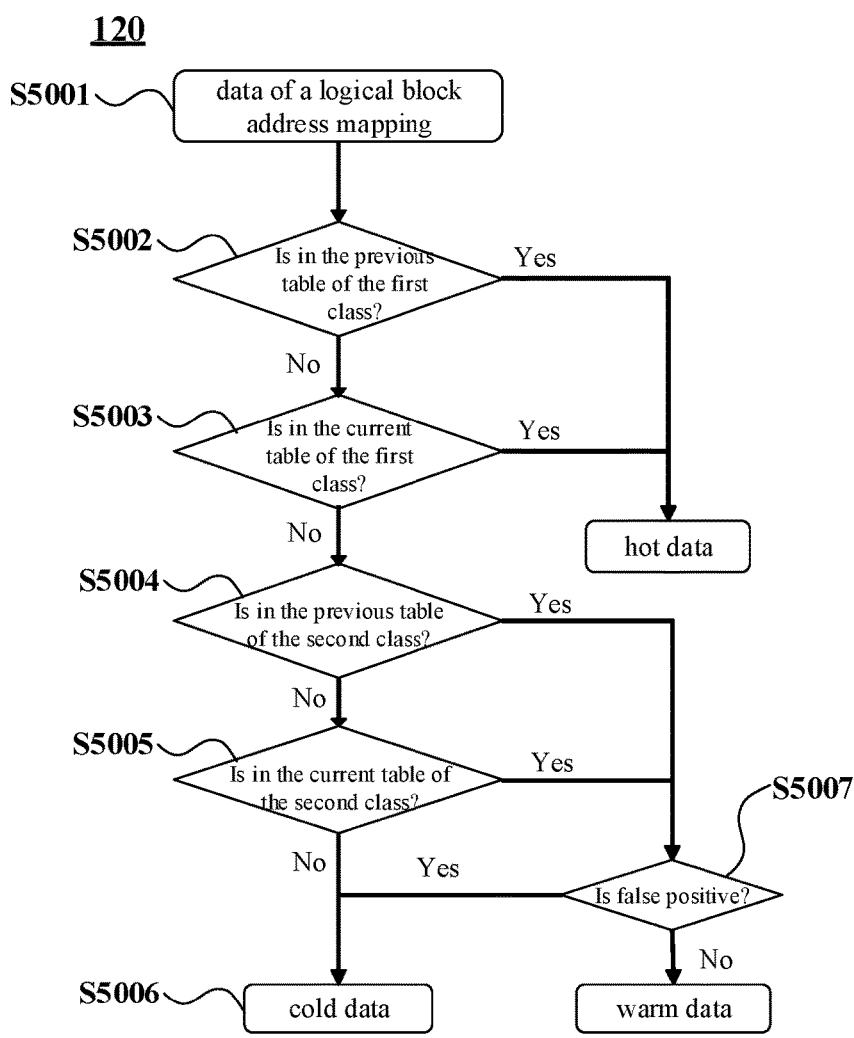
FIGS. 5A and 5B are a flow chart of a method of operating yet another memory system and a heat distribution diagram of data for yet another memory system, as provided by an example of the present disclosure.
Figure 5B:
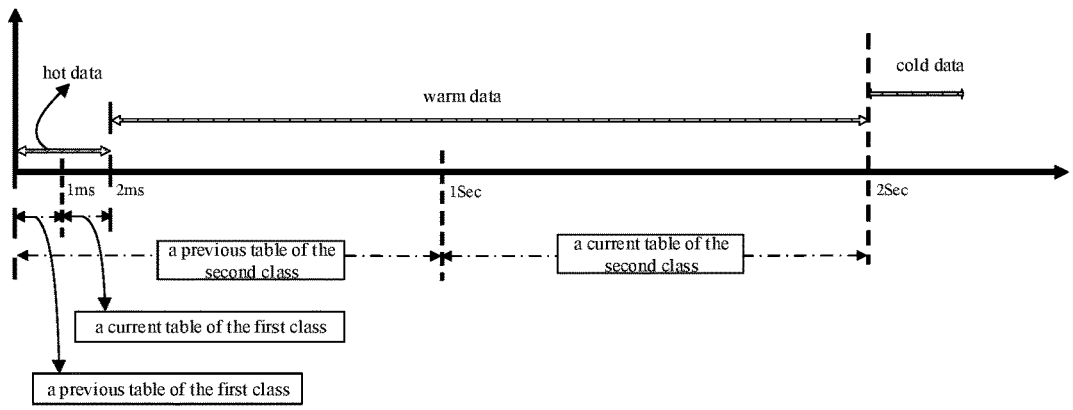

FIGS. 5A and 5B are flow chart and heat distribution diagram of data of still another method for operating a memory system provided by an example of the present disclosure. As shown in FIGS. 5A and 5B, in some examples, the number of tables of the first class includes two, and the number of tables of the second class includes two; In some examples, the memory controller 120 is configured to:

S5002 and S5003. when the data for the logical block address mapping is in the table of the first class for the current first time interval or the table of the first class for the previous first time interval, determine that the data corresponding to the logical block address is the hot data;

S5004 and S5005. when the data for the logical block address mapping is not in the table of the first class for the current first time interval nor the table of the first class for the previous first time interval, but in the table of the second class for the current second time interval or the table of the second class for the previous second time interval, determine that the data corresponding to the logical block address is the warm data;

S5006. when the data for the logical block address mapping is not in any of the table of the first class for the current first time interval, the table of the first class for the previous first time interval, or the table of the second class for the current second time interval, the table of the second class for the previous second time interval, determine that the data corresponding to the logical block address is the cold data.

Referring to FIGS. 5A and 5B, in some examples, two tables of the second class and two table of the first class are configured to alternately write data for the logical block address mapping into the complete queue.

the previous table of the first class and the current table of the first class are both configured to store data for the hot logical block address mapping; the previous table of the second class may store data for the hot logical block address mapping or data for the warm logical block address mapping; the current table of the second class may store data for the warm logical block address mapping; data for the cold logical block address mapping is not stored in the table of the first class nor the table of the second class.

In some examples, each of the tables of the second class is configured to store data for the logical block address mapping with a granularity of 1 Sec and a bit width of 31 bits, which is referred to a table of a second class with a granularity of 1 Sec hereinafter; each of the tables of the first class is configured to store data for the logical block address mapping with a granularity of 1 ms and a bit width of 31 bits, which is referred to a table of a first class with a granularity of 1 ms hereinafter.

When the data for the logical block address mapping may be queried from the previous table of the first class with 1 ms granularity or the current table of the first class with 1 ms granularity, the logical block address is a hot logical block address;

when the data for the logical block address mapping may not be queried from the two table of the first class with 1 ms granularity but the read data for the logical block address mapping may be queried from the current 1 Sec-level table of the second class or the previous table of the second class with 1 Sec granularity, the logical block address is a warm logical block address;

when the data for the logical block address mapping may not be queried from the two table of the first class with 1 ms granularity and the read data for the logical block address mapping may be queried from the two 1 Sec-level tables of the second class, the logical block address is a cold logical block address.

In some examples, the time interval range corresponding to the hot data, the time interval range corresponding to the warm data and the time interval range corresponding to the cold data together form a continuous time interval range; and the certainty with which the memory controller determines the heat of data corresponding to the logical block address of the received read command is increased.

In some examples, referring to FIG. 5B, the time interval range corresponding to the hot data is 1 μs~2 ms, the time interval range corresponding to the warm data is 2 ms~2 Ses, and the time interval range corresponding to the cold data is greater than 2 Ses; wherein, there is no overlapping range between the time interval range corresponding to the hot data and the time interval range corresponding to the warm data, and no overlapping range between the time interval range corresponding to the warm data and the time interval range corresponding to the cold data.

In some examples, the memory controller 120 is further configured to:
- when the data corresponding to the logical block address is the hot data, determining that the amount of drift corresponding to the logical block address is a first level of the amount of drift;
- when the data corresponding to the logical block address is the warm data, determining that the amount of drift corresponding to the logical block address is a second level of the amount of drift;
- when the data corresponding to the logical block address is the cold data, determining that the amount of drift corresponding to the logical block address is a third level of the amount of drift;
- wherein the first level of the amount of drift is less than the second level of the amount of drift, and the second level of the amount of drift is less than the third level of the amount of drift.

In practical applications, the read voltage with the first level of the amount of drift corresponds to reading of hot data (1 μs~2 ms); the read voltage with the first level of the amount of drift corresponds to reading of warm data (1 ms~2 s); the read voltage with the first level of the amount of drift corresponds to reading of cold data (1 s~several hours).

In this example, the heat of hot data, warm data, and cold data changes from large to small, i.e., the average time difference between writing and reading changes from small to large, respectively being 1 μs~2 ms, 1 ms~2 s, and 1 s~several hours. The higher the heat of the data, the more times the memory cell corresponding to the logical block address has been read or written, shift of the threshold voltage of the memory cell corresponding to the logical block address is smaller, and a smaller drift needs to be given. In some examples, according to the heat of the hot data, warm data, and cold data changing from large to small, the corresponding first level of the amount of drift, second level of the amount of drift, and third level of the amount of drift respectively change from small to large.

In some examples, the memory controller 120 is configured to:
- when determine that the data corresponding to the logical block address is the warm data with the tables of the first class and the tables of the second class, and a failure for the reading of the data in the memory cell corresponding to the logical block address with the read voltage corresponding to the warm data occurs, rereading the data in the memory cell corresponding to the logical block address with a read voltage corresponding to the cold data.

As illustrated in Operations S3005, S4007, and S5007 respectively shown in FIG. 3A, FIG. 4A, and FIG. 5A above, when data for the logical block address mapping may not be queried from two tables of the first class, but read data for the logical block address mapping may be queried from the current table of the second class or the previous table of the second class, it is to be determined whether the data for the logical block address mapping is false positive: if it is false positive, the data for the logical block address mapping comprises cold data; if it is not false positive, the data for the logical block address mapping comprises warm data.

The accuracy rate of querying the tables of the second class is not 100%, and there may be a misjudgment rate (i.e., false positives), for example, the probability of false positive in some Bloom filters is about 0.1%.

In some examples, as shown in FIGS. 4A and 5A, when data for the logical block address mapping may not be queried from two tables of the first class, but read data for the logical block address mapping may be queried from the current table of the second class or the previous table of the second class, the data in the memory cell corresponding to the logical block address is read first with the read voltage corresponding to the warm data, if a failure for the reading occurs, it indicates that the data for the logical block address mapping may have a false positive, and the data for the logical block address mapping may actually be cold data, at this point, the data in the memory cell corresponding to the logical block address may be read instead with a read voltage corresponding to the cold data or may be corrected with Error Correction Code (ECC); if the reading succeeds, it indicates that the data for the logical block address mapping does not have a false positive and the data for the logical block address mapping is the warm data, thus the data in the memory cell corresponding to the logical block address will be read still with the read voltage corresponding to the warm data.

The above describes in detail how to determine the level of the amount of drift corresponding to a logical block address, and some specific application scenarios for determining the level of the amount of drift corresponding to the logical block address will be introduced below.

Figure 6:
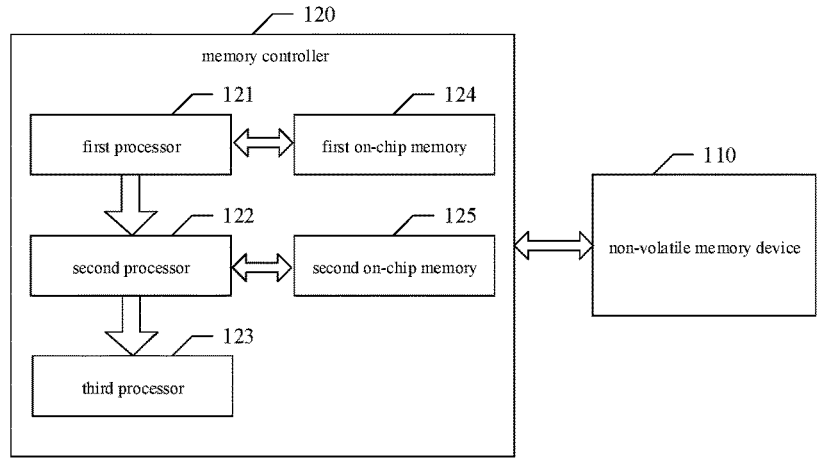
FIG. 6 is a block diagram of another memory system provided by another example of the present disclosure.
Figure 7:
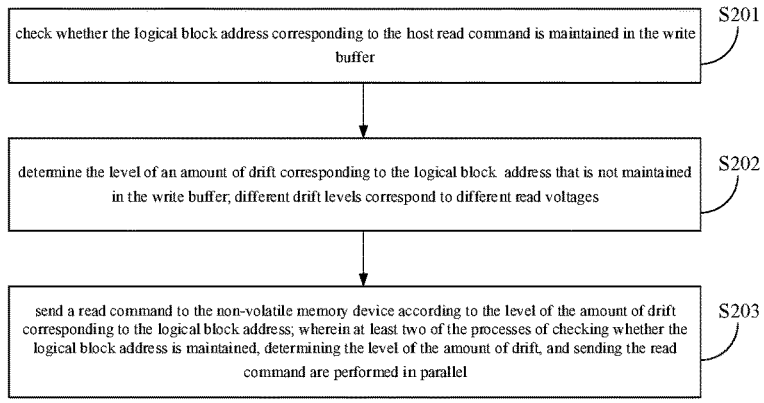
FIG. 7 is a schematic flowchart of a method of operating a memory system provided by an example of the present disclosure.

FIG. 6 is a block diagram of a memory system provided by an example of the present disclosure, FIG. 7 is a schematic flowchart of a method of operating a memory system provided by an example of the present disclosure. As shown in FIGS. 6 and 7, an example of the present disclosure provides a method of operating a memory system, the memory system 100 includes: at least one non-volatile memory device 110 and a memory controller 120 coupled to the non-volatile memory device 110; the memory controller is further configured to:
- Operation S201: check whether the logical block address corresponding to the received host read command is maintained in a write buffer;
- Operation S202: when the logical block address is not maintained in the write buffer, determine a level of the amount of drift corresponding to the logical block address that is not maintained in the write buffer;
- Operation S203: send a read command to the non-volatile memory device, according to the level of the amount of drift corresponding to the logical block address; wherein at least two of the processes of checking whether the logical block address is maintained, determining the level of the amount of drift, and sending the read command are performed in parallel.

In an example of the present disclosure, in operation S201, the host sends a read command to the memory controller 120, after receiving the read command sent by the host, the memory controller 120 checks whether the logical block address corresponding to the received read command is maintained in the write buffer, i.e., check whether the logical block address corresponding to the read command is available in the write buffer.

In some examples, if the logical block address corresponding to the read command is maintained in the write buffer, the data corresponding to the logical block address may be obtained from the write buffer. Here, the write buffer may be located in the host, and in the case that the logical block address corresponding to the read command is maintained in the write buffer, the data corresponding to the logical block address may be obtained from the write buffer, and at this point, the access distance for obtaining the data corresponding to the logical block address is relatively short.

In some examples, if the logical block address corresponding to the read command is not maintained in the write buffer, the data corresponding to the logical block address may be obtained from the non-volatile memory device 110. Here, in the case that the logical block address corresponding to the read command is not maintained in the write buffer, the data corresponding to the logical block address may be obtained from the non-volatile memory device 110 through the memory controller 120, and at this point, the access distance for obtaining the data corresponding to the logical block address is relatively long.

It is to be noted that the data for the logical block address mapping in operation S3001, operation S4001, and operation S5001 in the FIG. 3A, FIG. 4A, and FIG. 5A described above may be understood as the data of mapped from the logical block address not maintained in the write buffer obtained by performing operation S201 through a logical operation.

In an example of the present disclosure, in operation S202, when the logical block address is not maintained in the write buffer, for the logical block address that is not maintained in the write buffer, considering that the amounts of drift of the threshold voltage of different memory cells are different, the level of the amount of drift corresponding to the logical block address not maintained in the write buffer is determined. Wherein, the read voltages corresponding to different levels of the amount of drift are different, and in subsequent operations, the read voltage for performing the read command operation on the non-volatile memory device 110 may be determined according to the level of the amount of drift.

In an example of the present disclosure, in operation S203, a read command is sent to the non-volatile memory device 110 according to the level of the amount of drift corresponding to the logical block address. In this way, the read voltage for performing the read command operation on the non-volatile memory device 110 may be determined according to the level of the amount of drift corresponding to the logical block address, thereby ensuring the correctness of the read command operation and improving the reliability of the memory system 110.

In the example of the present disclosure, operation S201, operation S202 and operation S203 may be performed in manner of a pipeline. In some examples, in operation S201, it is checked whether the logical block address corresponding to the host read command is maintained in the write buffer, and different operations are subsequently performed according to whether the logical block address corresponding to the read command is maintained in the write buffer. For the logical block addresses that is not maintained in the write buffer, continue to execute operation S202. In other words, for a fixed logical block address, operation S201 is performed, and if the logical block address is not maintained in the write buffer, operation S202 may be performed for the logical block address. In the operation S202, a level of the amount of drift corresponding to the logical block address that is not maintained in the write buffer is determined, and operation S203 is continue to be performed. That is, for a fixed logical block address, operation S202 is performed, and in the case of determining the level of the amount of drift corresponding to the logical block address, operation S203 may be performed for the logical block address. In operation S203, a read command is sent to the non-volatile memory device 110 according to the level of the amount of drift corresponding to the logical block address. In other words, for a fixed logical block address, operation S203 is performed to send a read command to the non-volatile memory device 110 according to the level of the amount of drift corresponding to the logical block address.

It is to be noted that, for a fixed logical block address, operation S201, operation S202 and operation S203 are performed in a manner of a pipeline, i.e., operation S201, operation S202 and operation S203 are performed sequentially in serial. However, for multiple logical block addresses, operation S201, operation S202 and operation S203 may be performed in parallel. This is because that the time spent on performing operation S201, operation S202 and operation S203 respectively are different. In some examples, for two logical block addresses, i.e., a first logical block address and a second logical block address, operation S201, operation S202, and operation S203 may be performed sequentially on the first logical block address, and while operation S202 is being performed on the first logical block address, operation S201 may be performed on the second logical block address. That is, there is no need to wait for the first logical block address to complete operation S201, operation S202, and operation S203 before performing operation S201 on the second logical block address; the logical block addresses corresponding to the operations S201, S202 and S203 are different at the same time.

In an example of the present disclosure, through performing, in parallel, at least two of the processes of checking whether a logical block address is maintained in the write buffer, determining the level of the amount of drift corresponding to a logical block address that is not maintained in the write buffer, and sending a read command, a read latency may be optimized and thus reading efficiency may be improved.

It is to be noted that, at least two of the processes of checking whether the logical block address is maintained, determine the level of the amount of drift, and sending the read command include three cases. In the first case, operation S201 and operation S202 are combined, i.e., operation S201 and operation S202 are performed sequentially in serial by one processor; operation S203 is performed by another processor. In this case, the processes of operation S201 and operation S202 are performed in parallel with the processing procedure of operation S203. In this way, the reading time may be saved to a certain extent, the reading latency may be optimized, and the reading efficiency may be improved.

In the second case, operation S201 is performed by a processor, operation S202 and operation S203 are combined, i.e., operation S202 and operation S203 are performed sequentially in serial by another processor. In this case, the processing procedure of operation S201 is performed in parallel with the processes of operation S202 and operation S203. In this way, the reading time may be saved to a certain extent, the reading latency may be optimized, and the reading efficiency may be improved.

In the third case, operation S201, operation S202 and operation S203 are respectively performed by three processors. In this case, the processes of operation S201, operation S202 and operation S203 are all performed in parallel. In this way, the reading time may be further saved, the reading latency may be optimized, and the reading efficiency may be improved.

Figure 8:
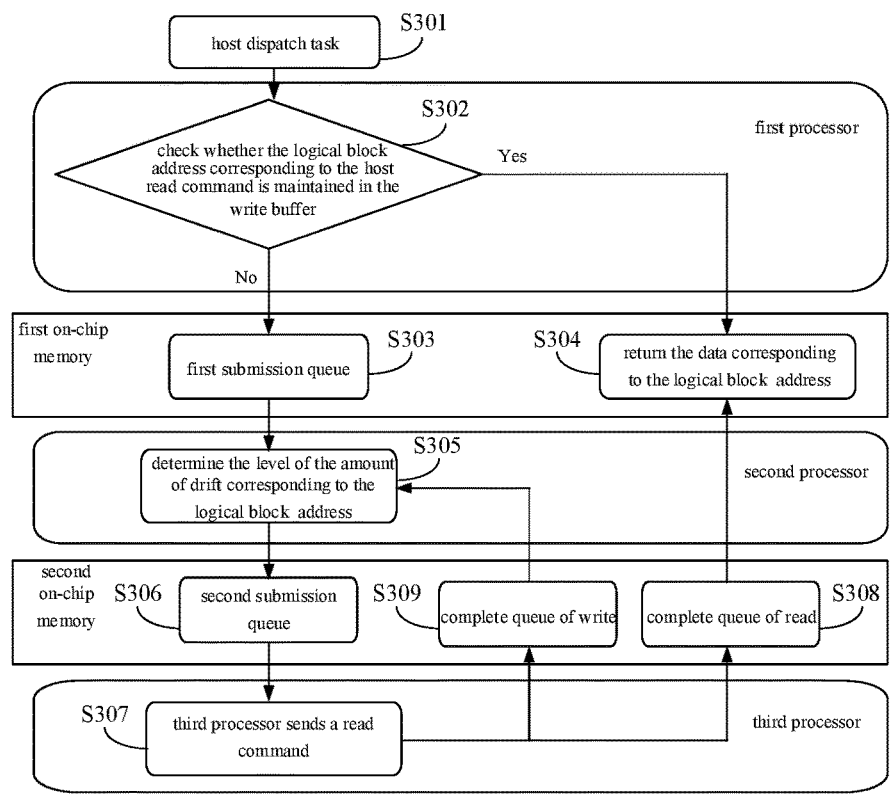
FIG. 8 is a flowchart diagram of a method of operating a memory system provided by an example of the present disclosure.

Referring to FIG. 8 below, FIG. 8 is a flowchart diagram of a method of operating a memory system provided by an example of the present disclosure. As shown in conjunction with FIGS. 6 and 8, the processes of checking whether the logical block address is maintained, determining the level of the amount of drift, and sending the read command are all performed in parallel are described in detail.

As shown in FIGS. 6 and 8, in some examples, the processes of checking whether the logical block address is maintained, determining the level of the amount of drift, and sending the read command are all performed in parallel; the memory controller 120 includes: a first processor 121, a second processor 122, a third processor 123, a first on-chip memory 124, and a second on-chip memory 125; wherein,
the first processor 121 is configured to: check whether the logical block address corresponding to the host read command is maintained in a write buffer, and submit the logical block address to a first submission queue, if the logical block address is not maintained in the write buffer;
the first on-chip memory 124 is configured to: store the first submission queue;
the second processor 122 is configured to: determine the level of the amount of drift corresponding to each of the logical block addresses in the first submission queue, and submit the level of the amount of drift corresponding to each of the logical block addresses to a second submission queue;
the second on-chip memory 125 is configured to: store the second submission queue;
the third processor 123 is configured to: send a read command to the non-volatile memory device 110 according to the level of the amount of drift corresponding to each of the logical block addresses in the second submission queue;
wherein at the same time, the logical block addresses corresponding to the first submission queue, the second submission queue and the sending the read command respectively are different.

As shown in FIG. 8, in operation S301, the host dispatch task, i.e., the host sends a read command. Wherein, the execution subject of operation S301 is a host.

In operation S302, it is checked whether the logical block address corresponding to the host read command is maintained in the write buffer. If the result of performing operation S302 is "No", i.e., the logical block address corresponding to the host read command is not maintained in the write buffer, then operation S303 is performed; if the result of performing operation S302 is "Yes", i.e., the logical block address corresponding to the host read command is maintained in the write buffer, then operation S304 is performed.

In other words, in operation S302, it is checked whether the logical block address corresponding to the host read command overlaps with the logical block address in the write buffer (Read LBA overlap check). If the logical block address corresponding to the host read command does not overlap with the logical block address in the write buffer (Writer Buffer Miss), i.e., the logical block address corresponding to the host read command is not maintained in the write buffer, then operation S303 is performed; and if the logical block address corresponding to the host read command overlaps with the logical block address in the write buffer (Writer Buffer Hit), i.e., the logical block address corresponding to the host read command is maintained in the write buffer, then operation S304 is performed.

In an example of the present disclosure, it is the first processor 121 (i.e., Core 1) which performs operation S302, and the first processor 121 is located in the memory controller 120.

In operation S303, submit the logical block address to a first submission queue, if the logical block address is not maintained in the write buffer. Wherein, the first submission queue is stored in a first On-chip memory (OCM) 124, and the first on-chip memory 124 is located in the memory controller 120. In other words, the first submission queue may also be referred to as a filtered submission queue, i.e., the logical block address that is not maintained in the write buffer is filtered out to form a filtered submission queue.

In an example of the present disclosure, when the logical block address corresponding to the read command is maintained in the write buffer, the first processor 121 returns the data corresponding to the logical block address; the first on-chip memory 124 stores the returned data.

In operation S304, for the logical block address maintained in the write buffer, the data corresponding to the logical block address may be returned, and the process of reading the data corresponding to the logical block address is completed. Wherein, the data corresponding to the logical block address maintained in the write buffer is stored in the first on-chip memory 124.

In operation S305, the level of the amount of drift corresponding to each of the logical block addresses in the first submission queue is determined, i.e., the level of the amount of drift (Predicate Drift Level) corresponding to each of the logical block addresses in the first submission queue is predicted, and the level of the amount of drift corresponding to each of the logical block addresses is submitted to the second submission queue.

In an example of the present disclosure, it is the second processor 122 (i.e., Core 2) that performs operation S305 is, and the second processor 122 is located in the memory controller 120.

Referring to the relevant content in FIGS. 1, 2A, 2B, 3A, 3B, 4A, 4B, 5A and 5B described above, how to determine the level of the amount of drift corresponding to each of the logical block addresses in the first submission queue will be described in detail below.

In some examples, before the second processor 122 determines the level of the amount of drift corresponding to each of the logical block addresses in the first submission queue and submits the level of the amount of drift corresponding to each of the logical block addresses to a second submission queue, the method of operating described above also includes:
the second processor 122 determining a level of the amount of drift corresponding to each of the logical block addresses according to the heat of the data corresponding to each of the logical block addresses in the first submission queue; the heat of the data represents a degree of length of average time difference between writing and reading of data.

Here, the level of the amount of drift corresponding to each of the logical block addresses is determined, according to the heat of the data corresponding to each of the logical block addresses in the first submission queue, i.e., according to a degree of length of the time difference between writing data and reading of data corresponding to each of the logical block addresses in the first submission queue. Wherein, if the time difference between writing data and reading of data corresponding to a logical block address is shorter, it indicates that the degree of the heat of the data corresponding to the logical block address is higher; accordingly, the amount of drift of threshold voltage of the memory cells for storing these data with higher degree of heat is smaller. Conversely, if the time difference between writing data and reading of data corresponding to a logical block address is longer, it indicates that the degree of the heat of the data corresponding to the logical block address is lower; accordingly, the amount of drift of threshold voltage of the memory cells for storing these data with lower degree of heat is greater.

In an example of the present disclosure, according to the heat of data corresponding to each of the logical block addresses in the first submission queue, considering that the amounts of drift of the threshold voltage of the memory cells for storing these data are different, different read voltages are applied during the performing of read command operations on the non-volatile memory device, thereby ensuring the correctness of read command operation and improving the reliability of the memory system.

In some examples, the second processor 122 determining a level of the amount of drift corresponding to each of the logical block addresses according to the heat of the data corresponding to each of the logical block addresses in the first submission queue includes:

the second processor 122 determines that the amount of drift corresponding to the logical block address is a first level of the amount of drift when the data corresponding to the logical block address is the hot data; the second processor 122 determines that the amount of drift corresponding to the logical block address is a second level of the amount of drift when the data corresponding to the logical block address is the warm data; the second processor 122 determines that the amount of drift corresponding to the logical block address is a third level of the amount of drift when the data corresponding to the logical block address is the cold data; wherein the first level of the amount of drift is less than the second level of the amount of drift, and the second level of the amount of drift is less than the third level of the amount of drift.

As mentioned above, the amount of drift of threshold voltage of the memory cell for storing hot data is the smallest one, the amount of drift of threshold voltage of the memory cell for storing warm data is the second one, and the amount of drift of threshold voltage of the memory cell for storing cold data is the largest one. In this way, amount of drift of threshold voltages of the memory cells are determined to be different according to the difference in heat of data stored in the memory cells, and subsequently, different read voltages are correspondingly determined to be applied when read command operations are performed on these memory cells according to the difference in the amount of drift of threshold voltages of the memory cells.

In some examples, the method described above further includes:

The second processor 122 determines the ranking of the logical block addresses in the second submission queue according to the heat of data corresponding to each of the logical block addresses in the first submission queue; wherein, the higher is the heat of the data corresponding to the logical block address, the higher is the priority of the ranking of the logical block address in the second submission queue.

Here, the multiple logical block addresses in the first submission queue are out of order, i.e., the ranking of the hot data, warm data and cold data corresponding to the logical block addresses in the first submission queue is irregular. That is, if it is determined that the logical block address is not maintained in the write buffer, the logical block address may be submitted to the first submission queue, then the ranking of the multiple logical block addresses in the first submission queue corresponds to the time when it is determined that the logical block addresses are not maintained in the write buffer. Wherein, it is determined that the heat of the data corresponding to the multiple logical block addresses not maintained in the write buffer is randomly distributed. Without considering the ranking of hot data, warm data, and cold data corresponding to the logical block addresses in the first submission queue, the level of the amount of drift corresponding to each of the logical block addresses in the first submission queue is sequentially determined to obtain a second submission queue, a read command operation is sequentially performed on each of the logical block addresses in the second submission queue.

It is to be noted that the time difference between writing and reading corresponding to hot data is very short (i.e., 1 microsecond to 2 milliseconds), and if, at this point, the ranking of the hot data corresponding to the logical block address in the first submission queue is low (i.e., the priority of operating the hot data corresponding to the logical block address is low), then wait until the level of the amount of drift corresponding to the hot data corresponding to the logical block address in the first submission queue is determined, and further wait until a read command operation is performed on the hot data corresponding to the logical block address. In other words, the time for operating the hot data corresponding to the logical block address may exceed the timeliness of the hot data. Therefore, the ranking of the logical block addresses in the second submission queue may be determined according to the heat of data corresponding to each of the logical block addresses in the first submission queue; and the higher is the heat of the data corresponding to the logical block address in the first submission queue, the higher is the ranking of the logical block address in the second submission queue, and the higher is the priority of the read command operation on the logical block address. In this way, the process of performing read command operations on hot data may be accelerated, and the timeliness requirement of hot data may be met.

In Operation S306, the level of the amount of drift corresponding to each of the logical block addresses is submitted to a second submission queue. Wherein, the second submission queue is stored in the second on-chip memory 125, and the second on-chip memory 125 is located in the memory controller 120. In other words, the second submission queue may also be referred to as a predicted submission queue, i.e., the level of the amount of drift corresponding to each of the logical block addresses is predicted to form a predicted submission queue.

In Operation S307, a read command is sent to the non-volatile memory device 110 according to the level of the amount of drift corresponding to each of the logical block addresses in the second submission queue. If the reading is successful, then operation S308 is performed; and if a failure for the reading occurs, then operation S309 is performed.

In some examples, the third processor 123 sends a read command to the non-volatile memory device 110 according to the level of the amount of drift corresponding to each of the logical block addresses in the second submission queue, in some examples, the third processor 123 is configured to:

determine a read voltage for performing a read command operation on the non-volatile memory device 110 according to the level of the amount of drift corresponding to each of the logical block addresses in the second submission queue;

send a read command to the non-volatile memory device 110 according to the read voltage for performing the read command operation on the non-volatile memory device 110.

In an example of the present disclosure, it is the third processor 123 that performs operation S307, and the third processor 123 is located in the memory controller 120. In other words, the third processor 123 may also be referred to as storage medium controller, and the storage medium controller is located in the memory controller 120, and the storage medium controller is coupled to the non-volatile memory device 110 and configured to control the non-volatile memory device 110.

In some examples, after the third processor 123 sends a read command to the non-volatile memory device 110 according to the level of the amount of drift corresponding to each of the logical block addresses in the second submission queue, in some examples, the third processor is configured to:

in some examples, the third processor 123 is configured to: when the reading of non-volatile memory device 110 is successful, the logical block address of the read command is submitted to the complete queue of read; and when the reading of non-volatile memory device 110 fails, the logical block address of the read command is submitted to the complete queue of write;

The second on-chip memory 125 is configured to: store the complete queue of read and the complete queue of write;

the second processor 122 is configured to: redetermine the level of the amount of drift corresponding to each of the logical block addresses in the complete queue of write.

In operation S308, when the reading of non-volatile memory device 110 successes, the logical block address corresponding to the read command is submitted to the complete queue of read. Wherein, the complete queue of read is stored in the second on-chip memory 125, and the second on-chip memory 125 is located in the memory controller 120.

In operation S309, when the reading of non-volatile memory device 110 fails, the logical block address corresponding to the read command is submitted to the complete queue of write, and return to perform operation S305 for each of the logical block addresses in the complete queue of write, and re-determine the level of the amount of drift corresponding to each of the logical block addresses in the complete queue of write. Wherein, the complete queue of write is stored in the second on-chip memory 125, and the second on-chip memory 125 is located in the memory controller 120.

In some examples, the second processor 122 may determine, through querying the Bloom filter, whether the data corresponding to each of the logical block addresses in the first submission queue is the warm data or cold data. However, the accuracy rate of querying Bloom filters is not 100%, i.e., there may be misjudgment rate (i.e., false positive). In other words, the second processor 122 determines that the data corresponding to the logical block address in the first submission queue is the warm data (or cold data) through querying the Bloom filter, but in fact, the data corresponding to the logical block address is the cold data (or warm data). Further, the level of the amount of drift corresponding to the logical block address is determined according to the heat of the data corresponding to the logical block address, and then the read voltage is determined according to the level of the amount of drift corresponding to the logical block address. Since the result of determining the heat of the data corresponding to the logical block address in the first submission queue is wrong, furthermore, the result of determining drift level corresponding to the logical block address is wrong according to the heat of the data corresponding to the logical block address, and then the result of determining the read voltage is also wrong. Using a wrong read voltage for the read command operation may cause a failure of reading. Therefore, the levels of drift corresponding to the logical block addresses corresponding to these failed read command operations are to be redetermined.

In an example of the present disclosure, the algorithm design of the memory controller 120 may be optimized without increasing the cost, i.e., without adding any hardware, and the read voltage for performing the read command operation on the non-volatile memory device 110 may be determined according to the amount of drift corresponding to the logical block address, thereby ensuring the correctness of the read command operation, and in turn improving the reliability of the memory system; furthermore, through performing, in parallel, the processes of checking whether a logical block address is maintained in the write buffer, determining the level of the amount of drift corresponding to a logical block address that is not maintained in the write buffer, and sending a read command, read latency may be optimized and thus reading efficiency may be improved.

Figure 9:
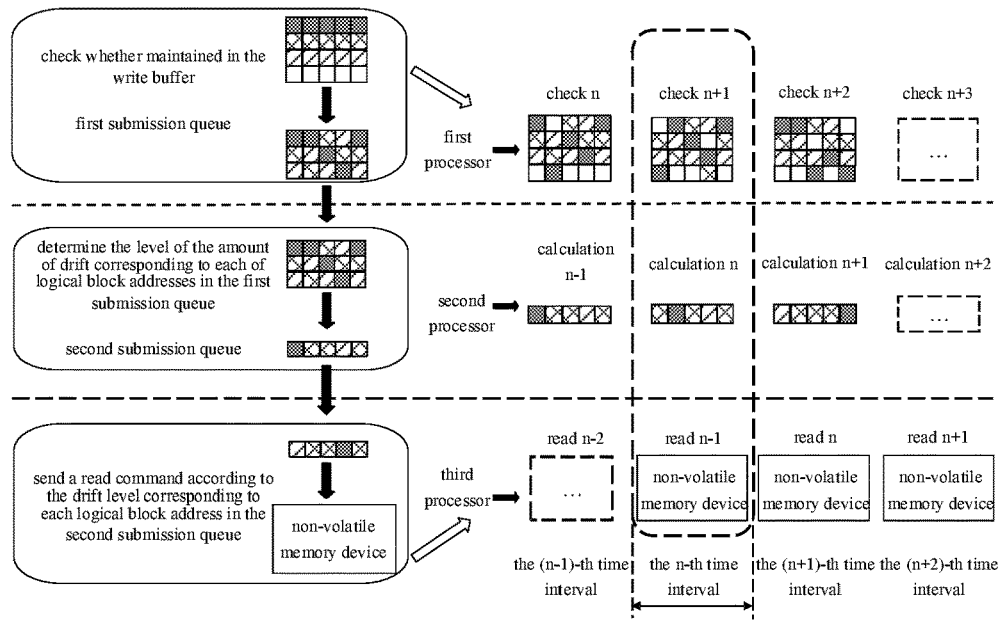
FIG. 9 is a schematic diagram of logical block addresses corresponding to a first processor, a second processor, and a third processor in the n-th time interval in the method of operating of a memory system provided by an example of the present disclosure.

Referring to FIG. 9, FIG. 9 is a schematic diagram of logical block addresses corresponding to a first processor, a second processor, and a third processor in the n-th time interval of the method of operating a memory system provided by an example of the present disclosure. FIG. 9 shows operation S201, operation S202 and operation S203, and different operations are separated by dotted lines. A first processor is configured to perform operation S201, a second processor is configured to perform operation S202, and a third processor is configured to perform operation S203.

In some examples, the first processor is configured to perform operation S201, to check whether the logical block address corresponding to the host read command is maintained in a write buffer, and submit the logical block address to a first submission queue, if the logical block address is not maintained in the write buffer. That is, each of the logical block addresses in the first submission queue is not maintained in the write buffer, and the first processor filters out logical block addresses which are not maintained in the write buffer among the logical block addresses corresponding to the host read command. In some examples, the first processor may check a total of 20 logical block addresses in each time interval, and submit the logical block addresses which are not maintained in the write buffer among the 20 logical block addresses to the first submission queue.

It is to be noted that the multiple logical block addresses in the first submission queue are out of order, i.e., the ranking of the hot data, warm data and cold data corresponding to the logical block addresses in the first submission queue is irregular.

In some examples, the second processor is configured to perform operation S202, to determine the level of the amount of drift corresponding to each of the logical block addresses in the first submission queue, and submit the level of the amount of drift corresponding to each of the logical block addresses to a second submission queue. In some examples, the second processor may determine (or calculate) levels of the amount of drift corresponding to a total of 5 logical block addresses within each time interval. That is, within time intervals with the same length, the number of logical block addresses processed by the first processor and the second processor respectively may be different.

In some examples, the third processor is configured to perform operation S203, to send a read command to the non-volatile memory device 110 according to the level of the amount of drift corresponding to each of the logical block addresses in the second submission queue.

In an example of the present disclosure, for a fixed logical block address, operation S201, operation S202 and operation S203 are performed in a manner of a pipeline. However, for multiple logical block addresses, within the n-th time interval, the first processor performs the (n+1)-th round of checking whether the logical block address is maintained in the write buffer; the second processor performs the n-th round of determining the level of the amount of drift corresponding to the logical block address in the first submission queue; and the third processor performs the (n−1)-th round of sending a read command corresponding to the level of the amount of drift of the logical block address in the second submission queue; wherein, n is a positive integer. That is, operation S201, operation S202, and operation S203 are performed in parallel, and at the same time, the logical block addresses processed by operation S201, operation S202, and operation S203 are different.

It is to be noted that, for each of operation S201, operation S202 and operation S203, there are the (n−1)-th round, the n-th round and the (n+1)-th round in which time intervals thereof are continuous, and the processing time of each of rounds corresponds to a time interval. Here, the duration of a time interval may be selected depend on the actual condition, and the setting of the time period corresponding to the heat and the parameters of each of processors in the memory controller may be considered. In some examples, the duration of the time interval may be K*160 ns, wherein, K may be obtained according to empirical values.

It is to be noted that the number of rounds processed by two adjacent operations in the same time interval differs by at least one round; and the difference in the number of rounds processed by two adjacent operations in the same time interval may be adjusted according to actual needs.

In some examples, the number of rounds processed by two adjacent operations in the same time interval differs by one round, as shown in FIG. 9, in the n-th time interval, operation S201 is processing the (n+1)-th round, operation S202 is processing the n-th round, and operation S203 is processing the (n−1)-th round. The logical block address corresponding to the received read command has been processed by the (n−1)-th time interval, the n-th time interval, the (n+1)-th time interval, the (n+2)-th time interval . . . of continuous time intervals. For example, the first processor completes the processing of the n-th round of check (check n shown in FIG. 9) on the logical block address corresponding to the received read command triggered in the (n−1)-th time interval in the (n−1)-th time interval; and after processing of the n-th round of check is completed by the first processor, the second processor will complete the processing of the n-th round of calculation (calculation n shown in FIG. 9) on this logical block address in the n-th time interval; and after the processing of the n-th round of calculation is completed by the second processor, the third processor will complete the processing of the n-th round of read (read n shown in FIG. 9) on this logical block address in the (n+1)-th time interval.

That is, the processings of check, calculation, and read for the logical block address corresponding to the received read command triggered by the (n−1)-th time interval will be completed in sequence in the next three trigger time intervals (the (n−1)-th time interval, the n-th time interval and the (n+1)-th time interval). No redundant time is provided between two adjacent processing operations. For example, the data checked by the first processor will be calculated and processed in the second processor immediately, and there is no redundant time between the checking and calculating, which may improve the efficiency of data processing.

In other examples, the number of rounds processed by two adjacent operations in the same time interval differs by two rounds (not shown in FIG. 9), in the (n−1)-th time interval, operation S201 is processing the n-th round, operation S202 is processing the (n−2)-th round (not shown in FIG. 9), and operation S203 is processing the (n−4)-th round (not shown in FIG. 9).

The processing of check, calculation, and read for the logical block address corresponding to the received read command triggered by the (n−1)-th time interval will be completed in sequence in the three spaced trigger time intervals ((n−1)-th time interval, (n+1)-th time interval, (n+3)-th time interval (not shown in FIG. 9)). A redundancy time of one time interval is provided between two adjacent processing operations, e.g., the data checked by the first processor in the (n−1)-th time interval will not immediately be performed a calculation processing in the second processor, but will be performed a calculation processing in the (n+1)-th time interval after waiting for a time interval (the n-th time interval), and a redundant time of one time interval is provided between the check and calculation. The memory controller may use a time interval (the n-th time interval) to perform other processing (e.g., ECC verification, etc.), which may improve the reliability of data processing.

It may be understood that, for a fixed logical block address, operation S201, operation S202 and operation S203 are performed in serial, but for multiple logical block addresses, operation S201, operation S202 and operation S203 are performed in parallel.

In an example of the present disclosure, the memory system may include a storage class memory (SCM); the non-volatile memory device may include a phase change memory.

At the existing storage level, there is a gap in storage speed and storage capacity between Dynamic Random Access Memory (DRAM) and non-volatile memory devices (e.g., NAND flash memory), which limits the further improvement of computing capability of a computer. In this respect, a storage class memory is proposed, of which storage speed and storage capacity are larger than those of a dynamic random access memory, but smaller than those of a non-volatile memory device. Various attributes of DRAM, Phase Change Memory, and NAND-type flash memory include whether they are non-volatile memory devices, storage density, erasure requirements, software support, the number of erase and write, read latency and write latency. Among them, the storage speed (read latency and write latency) and storage capacity (storage density) of PCM enable the PCM to better locate between the dynamic random access memory and the non-volatile memory device, acting as an intermediate memory.

At present, there are various types of storage medium for storage class memory, mainly including phase change memory, resistive random access memory, magnetic random access memory and carbon nanotube random access memory.

The basic principle of a phase change memory is: apply an electric pulse with a large signal value and a short duration (i.e., high and narrow) to the phase change memory cell, and under the action of Joule heat, etc., a part of the initial crystalline of a phase change memory layer melts due to the temperature being higher than the melting temperature and after the electric pulse is interrupted, the molten portion cools rapidly and stays in an amorphous state with a low order of atomic, thereby the conversion from low resistance to high resistance is completed, which is the reset process. The molten portion in this process is referred to as the programming volume. If an electric pulse with a small signal value and a long duration (i.e., low and wide) is applied, the temperature in the programming volume reaches above the crystallization temperature and below the melting temperature, and holds for a sufficient time to cause crystallization of the amorphous structure within the programmed volume, to reach a low-resistance state, which is the set process. The read process of the phase change memory is to apply a low and narrow electric pulse to the phase change memory cell, so that the phase change memory layer is below the crystallization temperature, and measure the resistance value of the phase change memory cell.

As phase change storage materials becomes the storage medium of phase change memory, the performance of phase change memory material directly affects the characteristics of the device. In some examples, the characteristics of phase change memory is mainly measured by indicators such as set operation speed, data retention and switching ratio. Therefore, research on the performance of phase change memory materials includes research on parameters such as crystallization rate, crystallization temperature, stability of amorphous structure, thermal stability, and resistance window (i.e., the ratio of resistivity of the amorphous and crystalline states).

For a phase change memory, among a set operation, a reset operation and a read operation, in some examples, the time of a set operation is longer, which becomes a key factor restricting the high-speed operation of phase change memory. The set operation time is related to the crystallization rate of the phase change memory material. The faster is the crystallization rate, the shorter is the set operation time, and the faster is the operation speed of the phase change memory.

The capability for maintaining data of a phase change memory depends on the stability and thermal stability of the amorphous structure of the phase change memory material. The better are the amorphous structure stability and thermal stability, the longer is the capability for maintaining data. To obtain better amorphous structure stability and thermal stability, the phase change memory material may be required to have a higher crystallization temperature.

The switching ratio of the phase change memory is determined by the resistance window of the phase change memory material. The resistance window refers to the difference in resistivity between the amorphous and crystalline states. The resistivity difference between the amorphous state and the crystalline state is large, and the resistance window is large to ensure a large switching ratio, so that the data may be read accurately and quickly in the read operation.

In an example of the present disclosure, the first on-chip memory 124 and the second on-chip memory 125 both include a Dynamic Random Access Memory or a Static Random Access Memory.

In an example of the present disclosure, the first on-chip memory 124 is configured to store the intermediate result of operation S201, including the first submission queue and the data corresponding to the logical block address maintained in the write buffer; the second on-chip memory 125 is configured to store the intermediate result of operation S202, including a second submission queue, a complete queue of write and a complete queue of read. Through performing operation S201, operation S202 and operation S203 in parallel, the efficiency of reading the non-volatile memory device 110 may be accelerated, and in turn, the storage capacity of the first on-chip memory 124 and the second on-chip memory 125 for storing these intermediate results may be minimized.

Figure 10:
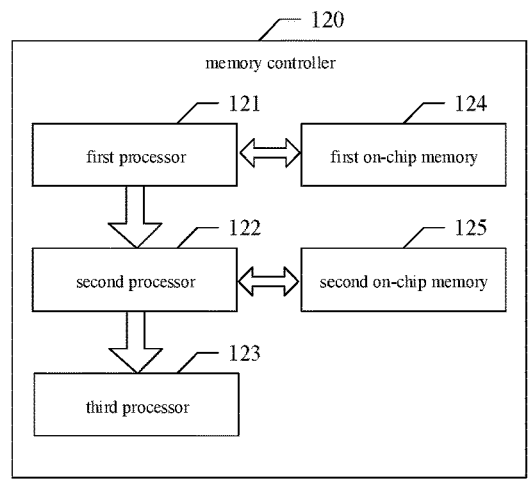
FIG. 10 is a block diagram of a memory controller provided by an example of the present disclosure.

Referring to FIG. 10, FIG. 10 is a block diagram of a memory provided by an example of the present disclosure. As shown in FIG. 10, according to a second aspect of an example of the present disclosure, a memory controller is provided, the memory controller 120 is coupled to at least one non-volatile memory device (not shown in FIG. 10); the memory controller 120 is configured to:

determine a heat of data corresponding to a logical block address of a received read command with tables of a first class and tables of a second class; the heat of the data represents a degree of length of average time difference between writing and reading of data; the tables of the first class include at least one table of the first class, and at least one of the tables of the first class is configured to store data for the logical block address mapping for each of the first time intervals within a first preset time period after writing; the tables of the second class include a plurality of tables of the second class, the plurality of tables of the second class are configured to alternately store data for the logical block address mapping for each of the second time intervals within a second preset time period after writing; the first preset time period is shorter than the second preset time period, and the first time interval is shorter than the second time interval;

determine a level of the amount of drift corresponding to the logical block address according to the heat of the data corresponding to the logical block address; different levels of the amount of drift correspond to different read voltages sent to the non-volatile memory device.

FIG. 10 illustrates that the memory controller 120 includes a first processor 121, a second processor 122, a third processor 123, a first on-chip memory 124 and a second on-chip memory 125. Wherein the first processor 121 checks whether the logical block address corresponding to the host read command is maintained in a write buffer, and submit the logical block address to a first submission queue, if the logical block address is not maintained in the write buffer; the first on-chip memory 124 stores the first submission queue; the second processor 122 determines the level of the amount of drift corresponding to each of the logical block addresses in the first submission queue, and submits the level of the amount of drift corresponding to each of the logical block addresses to a second submission queue; the second on-chip memory 125 stores the second submission queue; the third processor 123 sends a read command to the non-volatile memory device 110 according to the level of the amount of drift corresponding to each of the logical block addresses in the second submission queue; at the same time, the logical block addresses corresponding to the first submission queue, the second submission queue and the sending the read command respectively are different.

Referring to FIG. 1 described above, according to a third aspect of an example of the present disclosure, a method of operating a memory system is provided, the memory system 100 includes: at least one non-volatile memory device 110 and a memory controller 120 coupled to the non-volatile memory device 110; the method of operating includes:

determining a heat of data corresponding to a logical block address of a received read command with tables of a first class and tables of a second class; the heat of the data represents a degree of length of average time difference between writing and reading of data; the tables of the first class include at least one table of the first class, and at least one of the tables of the first class is configured to store data for the logical block address mapping for each of the first time intervals within a first preset time period after writing; the tables of the second class include a plurality of tables of the second class, the plurality of tables of the second class are configured to alternately store data for the logical block address mapping for each of the second time intervals within a second preset time period after writing; the first preset time period is shorter than the second preset time period, and the first time interval is shorter than the second time interval;

determining a level of the amount of drift corresponding to the logical block address according to the heat of the data corresponding to the logical block address;

different levels of the amount of drift correspond to different read voltages sent to the non-volatile memory device 110.

Referring to FIGS. 2A and 2B described above, in some examples, the method further includes: forming tables of a first class and tables of a second class; Forming tables of the first class and the tables of the second class includes:

storing, in the tables of the first class, data which are mapped through a mapping function in the hash table from the logical block addresses for each of the first time intervals within the first preset time period after writing;

storing, in the tables of the second class, data which are mapped through the mapping function in a Bloom filter, a Cuckoo filter, an XOR filter or a vacuum filter from the logical block addresses for each of the second time intervals within the second preset time period after writing.

Referring to FIGS. 3A and 3B described above, in some examples, the heat of the data includes: hot data, warm data, and cold data; the average time difference between writing and reading which corresponds to the hot data, the warm data, and the cold data respectively becomes longer in sequence;

determining the heat of data corresponding to the logical block address of the received read command with the tables of the first class and the tables of the second class, includes:

when a group of data for the logical block address mapping is in the tables of the first class, determine that the data corresponding to the logical block address is the hot data or warm data;

when the group of data for the logical block address mapping is not in the tables of the first class, but in the tables of the second class, determine that the data corresponding to the logical block address is the warm data or cold data;

when the group of data for the logical block address mapping is not in the tables of the first class nor the tables of the second class, determine that the data corresponding to the logical block address is the cold data.

Referring to FIGS. 4A and 4B described above, in some examples, the number of tables of the first class includes two, and the number of tables of the second class includes two;

determining the heat of data corresponding to the logical block address of the received read command with the tables of the first class and the tables of the second class, includes:

when the data for the logical block address mapping is in the table of the first class for the previous first time interval, determine that the data corresponding to the logical block address is the hot data;

when the data for the logical block address mapping is not in the table of the first class for the previous first time interval, but in the table of the first class for the current first time interval, determine that the data corresponding to the logical block address is the hot data or warm data;

when the data for the logical block address mapping is not in the table of the first class for the current first time interval nor the table of the first class for the previous first time interval, but in the table of the second class for the previous second time interval, determine that the data corresponding to the logical block address is the warm data;

when the data for the logical block address mapping is not in any of the table of the first class for the current first time interval, the table of the first class for the previous first time interval, or the table of the second class for the previous second time interval, but in the table of the second class for the current second time interval, determine that the data corresponding to the logical block address is the warm data or cold data;

when the data for the logical block address mapping is not in any of the table of the first class for the current first time interval, the table of the first class for the previous first time interval, or the table of the second class for the current second time interval, the table of the second class for the previous second time interval, determine that the data corresponding to the logical block address is the cold data.

Referring to FIGS. 5A and 5B described above, in some examples, the number of tables of the first class includes two, and the number of tables of the second class includes two;

determining the heat of data corresponding to the logical block address of the received read command with the tables of the first class and the tables of the second class, includes:

when the group of data for the logical block address mapping is in the table of the first class for the current first time interval or the table of the first class for the previous first time interval, determine that the data corresponding to the logical block address is the hot data;

when the group of data for the logical block address mapping is not in the table of the first class for the current first time interval nor the table of the first class for the previous first time interval, but in the table of the second class for the current second time interval or the table of the second class for the previous second time interval, determine that the data corresponding to the logical block address is the warm data;

when the group of data for the logical block address mapping is not in any of the table of the first class for the current first time interval, the table of the first class for the previous first time interval, or the table of the second class for the current second time interval, the table of the second class for the previous second time interval, determine that the data corresponding to the logical block address is the cold data.

In some examples, the determining a level of the amount of drift corresponding to the logical block address according to the heat of the data corresponding to the logical block address includes:
  when the data corresponding to the logical block address is the hot data, determining that the amount of drift corresponding to the logical block address is a first level of the amount of drift;
  when the data corresponding to the logical block address is the warm data, determining that the amount of drift corresponding to the logical block address is a second level of the amount of drift;
  when the data corresponding to the logical block address is the cold data, determining that the amount of drift corresponding to the logical block address is a third level of the amount of drift;
  wherein the first level of the amount of drift is less than the second level of the amount of drift, and the second level of the amount of drift is less than the third level of the amount of drift.

In some examples, the method further includes:
  when determining that the data corresponding to the logical block address is the warm data with the tables of the first class and the tables of the second class, and a failure for the reading of the data in the memory cell corresponding to the logical block address with the read voltage corresponding to the warm data occurs, rereading the data in the memory cell corresponding to the logical block address with a read voltage corresponding to the cold data.

Referring to FIG. 7 described above, in some examples, the method further includes:
  checking whether the logical block address corresponding to the received read command is maintained in the write buffer;
  when the logical block address is not maintained in the write buffer, determining the level of the amount of drift corresponding to the logical block address;
  sending a read command to the non-volatile memory device 110 according to the level of the amount of drift corresponding to the logical block address; wherein the processes of checking whether the logical block address is maintained, determining the level of the amount of drift, and sending the read command are performed in parallel.

Figure 11:
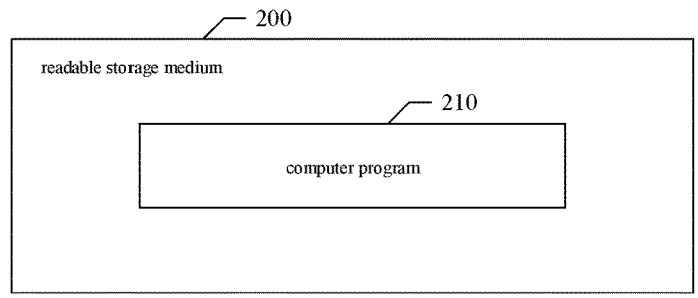
FIG. 11 is a block diagram of a readable storage medium provided by an example of the present disclosure.

Referring to FIG. 11, FIG. 11 is a block diagram of a readable storage medium provided by an example of the present disclosure. As shown in FIG. 11, an example of the present disclosure provides a readable storage medium, the readable storage medium 200 stores computer program 210, the computer program 210 when executed, may implement the method of operating for memory system of the technical schemes described above. The method of operating includes: checking whether the logical block address corresponding to the host read command is maintained in the write buffer; determining the level of the amount of drift corresponding to the logical block address that is not maintained in the write buffer; different levels of the amount of drift correspond to different read voltages; sending a read command to the non-volatile memory device 110 according to the level of the amount of drift corresponding to the logical block address; wherein at least two of the processes of checking whether the logical block address is maintained, determining the level of the amount of drift, and sending the read command are performed in parallel.

Figure 12:
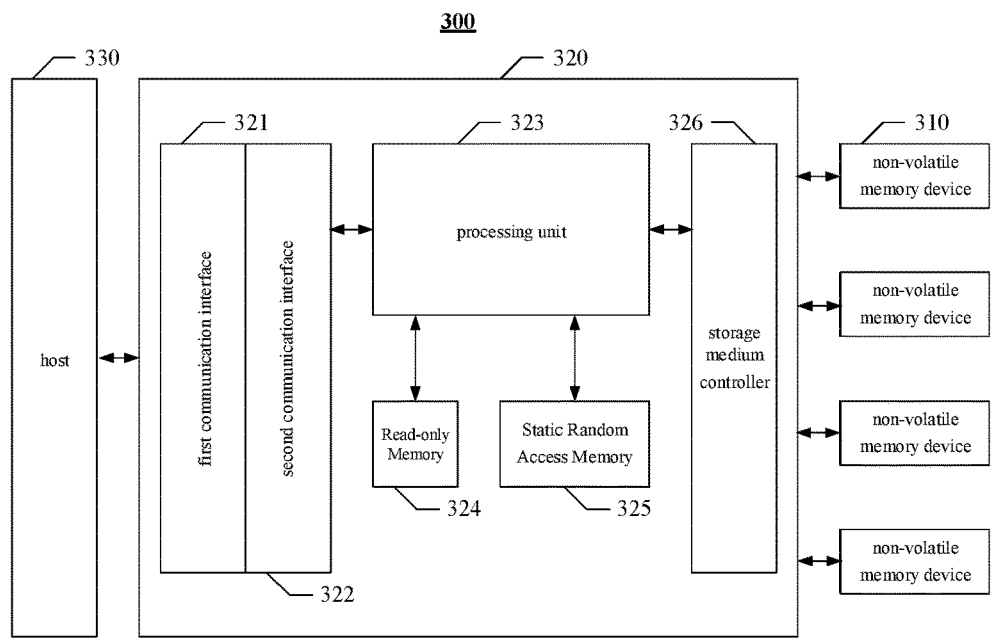
FIG. 12 is a block diagram of a system provided by an example of the present disclosure.

Referring to FIG. 12, FIG. 12 is a block diagram of a system provided by an example of the present disclosure. As shown in FIG. 12, system 300 may be a mobile phone, desktop computer, laptop computer, tablet computer, vehicle computer, or any other suitable electronic device having non-volatile memory device 310 therein.

As shown in FIG. 12, system 300 may include a host 330 and a memory system, and the memory system may include a memory controller 320 and at least one non-volatile memory device 310. The host 330 may be a processor of an electronic device (e.g., a Central Processing Unit (CPU)) or a System on Chip (SoC) (e.g., an Application Processor (AP)). The host 330 may be configured to send data to or receive data from the non-volatile memory device 310. FIG. 12 shows that the memory controller 320 is connected to four non-volatile memory devices 310, however in fact, examples of the present disclosure do not limit the number of non-volatile memory devices 310 connected to the memory controller 320, and the number of non-volatile memory devices 310 connected to the memory controller 320 may be less than 4 (e.g., 1); or the number of non-volatile memory devices 310 connected to the memory controller 320 may be greater than 4 (e.g., 5).

In some examples, the memory controller 320 may be coupled to the host 330 and the non-volatile memory device 310 respectively, and configured to control the non-volatile memory device 310. The memory controller 320 may manage data stored in the non-volatile memory device 310 and communicate with the host 330.

In a specific example, the memory system may include at least one non-volatile memory device 310 and a memory controller 320 coupled to the non-volatile memory device 310; wherein the memory system may include a storage class memory; the non-volatile memory device 310 may include a phase change memory.

Still referring to FIG. 12, the memory controller 320 includes a first communication interface 321, a second communication interface 322, a Processing Unit 323, a Read Only Memory (ROM) 324, a Static Random Access Memory 325 and a storage media controller 326. The processing unit 323 and the host 330 are communicatively connected through a first communication interface 321 and a second communication interface 322. The processing unit 323 may also be connected to a storage medium controller 326 for controlling the storage medium controller 326, and the storage medium controller 326 is connected to the non-volatile memory device 310 for controlling the non-volatile memory device 310. The processing unit 323 may also be connected to the Read-Only Memory 324 and the Static Random Access Memory 325, the processing unit 323 may obtain data from the Read-Only Memory 324, and the processing unit 323 may store part of the temporary data in the Static Random Access Memory 325.

In some examples, the first communication interface 321 may be Peripheral Component Interconnect Express (PCIE), i.e., the first communication interface may be an interface set according to the high-speed serial computer expansion bus standard; the second communication interface 322 may be a Compute Express Link (CXL).

In a specific example, the non-volatile memory device may include a phase change memory. The read latency at the system level will affect the actual throughput of a storage class memory. The threshold voltage of the phase change material of the phase change memory in the storage class memory will change over time. The Raw Bit Error Rate (RBER) may be guaranteed only through predicting the amount of drift corresponding to the logical block address of the data according to the heat of the data, and adjusting the read voltage according to the amount of drift corresponding to the logical block address.

When the read latency of the storage medium is very small (~160 nanoseconds), the amount of drift corresponding to each of the read logical block addresses is predicted, and the read voltage is adjusted according to the amount of drift corresponding to the logical block address. In an aspect, the drift time range of the threshold voltage is large, and it is difficult to track all the written logical block addresses. Different drift speeds may lead to read margin loss and Uncorrectable Error Correction Code (UECC). In another aspect, the time difference between writing and reading of the hot data is short, and through giving priority to reading the logical block address corresponding to the hot data, to avoid exceeding the timeliness of the hot data. Therefore, it is very important to predict the amount of drift of the storage medium (i.e., the phase change material) in the storage class memory and ensure the reliability and correctness of the data maintained in the storage medium.

In an example, a manner of a pipeline is employed to querying the Bloom filter and reading of data from the storage medium are performed in parallel, so that reading latency may be avoided. In this scheme, efficiency for the flow of reading among the core processor (i.e., the first processor and the second processor), the storage medium controller (i.e., the third processor) and the storage medium (i.e., the non-volatile memory device) are focused on. In this way, the promised Raw Bit Error Rate may be guaranteed without affecting the overall read latency.

In an example, the read operation includes the following three operations:

Operation 1, check whether the logical block address to be read overlaps with the logical block address in the write buffer by using the core processor (i.e., Core1); pack the logical block addresses that are not maintained in the write buffer to obtain the first submission queue; the core processor here may correspond to the first processor described above;

Operation 2, predict a drift of a logical block address that is not maintained in the write buffer by using the core processor (i.e., Core2); wherein, the amount of drift corresponding to the logical block address may be predicted according to the heat of the data corresponding to the logical block address; the core processor here may correspond to the second processor described above;

Operation 3, send a read command to the non-volatile memory device by using the storage medium controller, the amount of drift of the logical block address corresponding to the read command has been predicted in operation 2; the storage medium controller here may correspond to the third processor described above.

The three operations described above may be performed in a manner of a pipeline to improve reading efficiency, and the three operations run in parallel at the same time, the intermediate results obtained by each operation may be stored in the on-chip memory.

Examples of the present disclosure provide a memory system and a method of operating thereof, a memory controller and a readable storage medium, wherein the memory system includes: at least one non-volatile memory device and a memory controller coupled to the non-volatile memory device; the memory controller is configured to: determine whether data for the logical block address mapping of a received read command belongs to a table of a first class or a table of a second class, and confirm the heat of the data corresponding to the logical block address of the received read command according to the result for the determination; determine a level of the amount of drift corresponding to the logical block address according to the heat of the data corresponding to the logical block address; the difference in the levels of the amount of drift corresponding to the logical block addresses of the received read command causes different corresponding read voltages in the storage in the non-volatile memory device, i.e., examples of the present disclosure may determine a level of the amount of drift of a logical block address, and intentionally send a read voltage to the non-volatile memory device, so as to ensure the correctness of the read command operation, thereby improving the reliability of the memory system. Additionally, the alternate use of a plurality of tables of the second class is more flexible than the use of a single table and may save more space.

It should be understood that reference throughout the description to "one example" or "an example" indicates that a particular feature, structure or characteristic related to the example is included in at least one example of the present disclosure. Thus, appearances of "in one example" or "in an example" in various places throughout the description are not necessarily referring to a same example. Furthermore, these particular features, structures or characteristics may be combined in any appropriate manner in one or more Examples. It should be understood that in various Examples of the present disclosure, sequence numbers of the processes described above do not mean the execution order, and the execution order of each process should be determined by its function and internal logic, and should not constitute any limitation to implementation process of Examples of the present disclosure. The serial numbers of Examples of the present disclosure described above are for the purpose of description only, and do not represent the advantages and disadvantages of the Examples.

Considering this, in order to solve at least one technical problem existing in implementations, examples of the present disclosure provide a memory system and a method of operating thereof, a memory controller and a readable storage medium.

According to a first aspect of an example of the present disclosure, a memory system is provided, the memory system includes: at least one non-volatile memory device and a memory controller coupled to the non-volatile memory device; the memory controller is configured to:

determine a heat of data corresponding to a logical block address of a received read command with tables of a first class and tables of a second class; the heat of the data represents a degree of length of average time difference between writing and reading of data; the tables of the first class include at least one table of the first class, and at least one of the tables of the first class is configured to store data for a logical block address mapping for each of the first time intervals within a first preset time period after writing; the tables of the second class include a plurality of tables of the second class, the plurality of tables of the second class are configured to alternately store data for the logical block address mapping for each of the second time intervals within a second preset time period after writing; the first preset time period is shorter than the second preset time period, and the first time interval is shorter than the second time interval;

determine a level of an amount of drift corresponding to the logical block address according to the heat of the data corresponding to the logical block address;

different levels of the amount of drift correspond to different read voltages sent to the non-volatile memory device.

In the scheme described above, the tables of the first class are obtained through a hash table; the tables of the second class are obtained through a Bloom filter, a Cuckoo filter, an XOR filter or a vacuum filter.

In the scheme described above, the heat of the data includes: hot data, warm data, and cold data; the average time difference between writing and reading which corresponds to the hot data, the warm data, and the cold data respectively becomes longer in sequence; in some examples, the memory controller is configured to:

when the data for the logical block address mapping is in the tables of the first class, determine that the data corresponding to the logical block address is the hot data or warm data;

when the data for the logical block address mapping is not in the tables of the first class, but in the tables of the second class, determine that the data corresponding to the logical block address is the warm data or cold data;

when the data for the logical block address mapping is not in the tables of the first class or the tables of the second class, determine that the data corresponding to the logical block address is the cold data.

In the scheme described above, the number of tables of the first class includes two, and the number of tables of the second class includes two;

In some examples, the memory controller is configured to:

when the data for the logical block address mapping is in the table of the first class for a previous first time interval, determine that the data corresponding to the logical block address is the hot data;

when the data for the logical block address mapping is not in the table of the first class for the previous first time interval, but in the table of the first class for a current first time interval, determine that the data corresponding to the logical block address is the hot data or warm data;

when the data for the logical block address mapping is not in any of the table of the first class for the current first time interval or the table of the first class for the previous first time interval, but in the table of the second class for a previous second time interval, determine that the data corresponding to the logical block address is the warm data;

when the data for the logical block address mapping is not in any of the table of the first class for the current first time interval, the table of the first class for the previous first time interval, or the table of the second class for the previous second time interval, but in the table of the second class for a current second time interval, determine that the data corresponding to the logical block address is the warm data or cold data;

when the data for the logical block address mapping is not in any of the table of the first class for the current first time interval, the table of the first class for the previous first time interval, or the table of the second class for the current second time interval, the table of the second class for the previous second time interval, determine that the data corresponding to the logical block address is the cold data.

In the scheme described above, the number of tables of the first class includes two, and the number of tables of the second class includes two;

In some examples, the memory controller is configured to:

when the data for the logical block address mapping is in the table of the first class for the current first time interval or the table of the first class for the previous first time interval, determine that the data corresponding to the logical block address is the hot data;

when the data for the logical block address mapping is not in any of the table of the first class for the current first time interval nor the table of the first class for the previous first time interval, but in the table of the second class for the current second time interval or the table of the second class for the previous second time interval, determine that the data corresponding to the logical block address is the warm data;

when the data for the logical block address mapping is not in any of the table of the first class for the current first time interval, the table of the first class for the previous first time interval, or the table of the second class for the current second time interval, the table of the second class for the previous second time interval, determine that the data corresponding to the logical block address is the cold data.

In the scheme described above, the memory controller is further configured to:

when the data corresponding to the logical block address is the hot data, determine that the amount of drift corresponding to the logical block address is a first level of the amount of drift;

when the data corresponding to the logical block address is the warm data, determine that the amount of drift corresponding to the logical block address is a second level of the amount of drift;

when the data corresponding to the logical block address is the cold data, determine that the amount of drift corresponding to the logical block address is a third level of the amount of drift;

wherein the first level of the amount of drift is less than the second level of the amount of drift, and the second level of the amount of drift is less than the third level of the amount of drift.

In the scheme described above, in some examples, the memory controller is configured to:

when determining that the data corresponding to the logical block address is the warm data with the tables of the first class and the tables of the second class, and a failure for the reading of the data in the memory cell corresponding to the logical block address with the read voltage corresponding to the warm data occurs, reread the data in the memory cell corresponding to the logical block address with a read voltage corresponding to the cold data.

In the scheme described above, the memory controller is further configured to:

check whether the logical block address corresponding to the received read command is maintained in the write buffer;

when the logical block address is not maintained in the write buffer, determine the level of the amount of drift corresponding to the logical block address;

send a read command to the non-volatile memory device according to the level of the amount of drift corresponding to the logical block address; wherein at least two of the processes of checking whether the logical block address is maintained, determining the level of the amount of drift, and sending the read command are performed in parallel.

In the scheme described above, all of the processes of checking whether the logical block address is maintained, determining the level of the amount of drift, and sending the read command are performed in parallel; the memory controller includes: a first processor, a second processor, a third processor, a first on-chip memory, and a second on-chip memory; wherein, the first processor is configured to: check whether the logical block address corresponding to the received read command is maintained in a write buffer, and submit the logical block address to a first submission queue, if the logical block address is not maintained in the write buffer;

the first on-chip memory is configured to: store the first submission queue;

the second processor is configured to: determine the level of the amount of drift corresponding to each of the logical block addresses in the first submission queue, and submit the level of the amount of drift corresponding to each of the logical block addresses to a second submission queue;

the second on-chip memory is configured to: store the second submission queue;

the third processor is configured to: send a read command to the non-volatile memory device according to the level of the amount of drift corresponding to each of the logical block addresses in the second submission queue;

wherein at the same time, the logical block addresses corresponding to the first submission queue, the second submission queue and sending of the read command respectively are different.

In the scheme described above, in some examples, the third processor is configured to:

determine a read voltage for performing a read command operation on the non-volatile memory device, according to the level of the amount of drift corresponding to each of the logical block addresses in the second submission queue;

send a read command to the non-volatile memory device, according to the read voltage for performing the read command operation on the non-volatile memory device.

In the scheme described above, the first on-chip memory and the second on-chip memory both include a Dynamic Random Access Memory or a Static Random Access Memory.

In the scheme described above, the memory system includes a storage class memory; and the non-volatile memory device includes a phase change memory.

According to a second aspect of an example of the present disclosure, a memory controller is provided, the memory controller is coupled to the at least one non-volatile memory device; the memory controller is configured to:

determine a heat of data corresponding to a logical block address of a received read command with tables of a first class and tables of a second class; the heat of the data represents a degree of length of average time difference between writing and reading of data; the tables of the first class include at least one table of the first class, and at least one of the tables of the first class is configured to store data for the logical block address mapping for each of the first time intervals within a first preset time period after writing; the tables of the second class include a plurality of tables of the second class, the plurality of tables of the second class are configured to alternately store data for the logical block address mapping for each of the second time intervals within a second preset time period after writing; the first preset time period is shorter than the second preset time period, and the first time interval is shorter than the second time interval;

determine a level of the amount of drift corresponding to the logical block address according to the heat of the data corresponding to the logical block address; different levels of the amount of drift correspond to different read voltages sent to the non-volatile memory device.

According to a third aspect of an example of the present disclosure, a method of operating a memory system is provided, the memory system includes: at least one non-volatile memory device and a memory controller coupled to the non-volatile memory device; the method of operating includes:

determining a heat of data corresponding to a logical block address of a received read command with tables of a first class and tables of a second class; the heat of the data represents a degree of length of average time difference between writing and reading of data; the tables of the first class include at least one table of the first class, and at least one of the tables of the first class is configured to store data for the logical block address mapping for each of the first time intervals within a first preset time period after writing; the tables of the second class include a plurality of tables of the second class, the plurality of tables of the second class are configured to alternately store data for the logical block address mapping for each of the second time intervals within a second preset time period after writing; the first preset time period is shorter than the second preset time period, and the first time interval is shorter than the second time interval;

determining a level of the amount of drift corresponding to the logical block address according to the heat of the data corresponding to the logical block address;

different levels of the amount of drift correspond to different read voltages sent to the non-volatile memory device.

In the scheme described above, the method further includes: forming the tables of the first class and the tables of the second class;

the forming the tables of the first class and the tables of the second class includes:

storing, in the tables of the first class, data which are mapped through a mapping function in the hash table from the logical block addresses for each of the first time intervals within the first preset time period after writing;

storing, in the tables of the second class, data which are mapped through the mapping function in a Bloom filter, a Cuckoo filter, an XOR filter or a vacuum filter from the logical block addresses for each of the second time intervals within the second preset time period after writing.

In the scheme described above, the heat of the data includes: hot data, warm data, and cold data; the average time difference between writing and reading which corresponds to the hot data, the warm data, and the cold data respectively becomes longer in sequence;

the determining the heat of the data corresponding to the logical block address of the received read command with the tables of the first class and the tables of the second class, includes:
  when a group of data for the logical block address mapping is in the tables of the first class, determining that the data corresponding to the logical block address is the hot data or warm data;
  when the group of data for the logical block address mapping is not in the tables of the first class, but in the tables of the second class, determining that the data corresponding to the logical block address is the warm data or cold data;
  when the group of data for the logical block address mapping is not in the tables of the first class nor the tables of the second class, determining that the data corresponding to the logical block address is the cold data.

In the scheme described above, the number of tables of the first class includes two, and the number of tables of the second class includes two;
  the determining the heat of the data corresponding to the logical block address of the received read command with the tables of the first class and the tables of the second class, includes:
  when the data for the logical block address mapping is in the table of the first class for the previous first time interval, determining that the data corresponding to the logical block address is the hot data;
  when the data for the logical block address mapping is not in the table of the first class for the previous first time interval, but in the table of the first class for the current first time interval, determining that the data corresponding to the logical block address is the hot data or warm data;
  when the data for the logical block address mapping is not in the table of the first class for the current first time interval nor the table of the first class for the previous first time interval, but in the table of the second class for the previous second time interval, determining that the data corresponding to the logical block address is the warm data;
  when the data for the logical block address mapping is not in any of the table of the first class for the current first time interval, the table of the first class for the previous first time interval, or the table of the second class for the previous second time interval, but in the table of the second class for the current second time interval, determining that the data corresponding to the logical block address is the warm data or cold data;
  when the data for the logical block address mapping is not in any of the table of the first class for the current first time interval, the table of the first class for the previous first time interval, or the table of the second class for the current second time interval, the table of the second class for the previous second time interval, determining that the data corresponding to the logical block address is the cold data.

In the scheme described above, the number of tables of the first class includes two, and the number of tables of the second class includes two;
  the determining the heat of the data corresponding to the logical block address of the received read command with the tables of the first class and the tables of the second class, includes:
  when the group of data for the logical block address mapping is in the table of the first class for the current first time interval or the table of the first class for the previous first time interval, determining that the data corresponding to the logical block address is the hot data;
  when the group of data for the logical block address mapping is not in the table of the first class for the current first time interval nor the table of the first class for the previous first time interval, but in the table of the second class for the current second time interval or the table of the second class for the previous second time interval, determining that the data corresponding to the logical block address is the warm data;
  when the group of data for the logical block address mapping is not any of the table of the first class for the current first time interval, the table of the first class for the previous first time interval, or the table of the second class for the current second time interval, the table of the second class for the previous second time interval, determining that the data corresponding to the logical block address is the cold data.

In the scheme described above, the determining a level of the amount of drift corresponding to the logical block address according to the heat of the data corresponding to the logical block address includes:
  when the data corresponding to the logical block address is the hot data, determining that the amount of drift corresponding to the logical block address is a first level of the amount of drift;
  when the data corresponding to the logical block address is the warm data, determining that the amount of drift corresponding to the logical block address is a second level of the amount of drift;
  when the data corresponding to the logical block address is the cold data, determining that the amount of drift corresponding to the logical block address is a third level of the amount of drift;
  wherein the first level of the amount of drift is less than the second level of the amount of drift, and the second level of the amount of drift is less than the third level of the amount of drift.

In the scheme described above, the method further includes:
  when determining that the data corresponding to the logical block address is the warm data with the tables of the first class and the tables of the second class, and a failure for the reading of the data in the memory cell corresponding to the logical block address with the read voltage corresponding to the warm data occurs, rereading the data in the memory cell corresponding to the logical block address with a read voltage corresponding to the cold data.

In the scheme described above, the method further includes:
  checking whether the logical block address corresponding to the received read command is maintained in the write buffer;
  when the logical block address is not maintained in the write buffer, determining the level of the amount of drift corresponding to the logical block address;
  sending a read command to the non-volatile memory device, according to the level of the amount of drift corresponding to the logical block address; wherein the processes of checking whether the logical block address is maintained, determining the level of the amount of drift, and sending the read command are performed in parallel.

According to a fourth aspect of an example of the present disclosure, a computer readable storage medium is provided, the computer readable storage medium stores computer program that when executed, may implement the method of operating for memory system of any one of the schemes described above.

Examples of the present disclosure provide a memory system and a method of operating thereof, a memory controller and a readable storage medium, wherein the memory system includes: at least one non-volatile memory device and a memory controller coupled to the non-volatile memory device; the memory controller is configured to: determine whether data for the logical block address mapping of a received read command belongs to tables of a first class or tables of a second class, and confirm the heat of the data corresponding to the logical block address of the received read command according to the determined result; determine a level of the amount of drift corresponding to the logical block address, according to the heat of the data corresponding to the logical block address; if the levels of the amount of drift corresponding to the logical block address of the received read command differ, then the read voltages corresponding to the storage of the non-volatile memory device differ, i.e., according to the examples of the present disclosure, a level of the amount of drift of a logical block address is determined, and a read voltage is intentionally sent to the non-volatile memory device, so as to ensure the correctness of the read command operation, thereby improving the reliability of the memory system. Additionally, the alternate use of multiple tables of a second class is more flexible and may save more space than that of the use of a single table.

The above is only an example of the present disclosure, and does not limit the patent scope of the present disclosure, and under the inventive concept of the present disclosure, any equivalent structural transformation made with the content of the present disclosure and the accompanying drawings, or direct/indirect application in other related technical fields are included in the patent protection scope of the present disclosure.

What is claimed is:

1. A memory system, comprising:
   a non-volatile memory device; and
   a memory controller coupled to the non-volatile memory device and configured to:
   determine a heat of data corresponding to a logical block address of a received read command with tables of a first class and tables of a second class; the heat of the data represents a degree of length of average time difference between writing and reading of the data; the tables of the first class include a table of the first class, and the table of the first class is configured to store data for a logical block address mapping for each of first time intervals within a first preset time period after writing; the tables of the second class include a plurality of tables of the second class, the plurality of tables of the second class are configured to alternately store data for the logical block address mapping for each of second time intervals within a second preset time period after writing; the first preset time period is shorter than the second preset time period, and the first time interval is shorter than the second time interval; and
   determine a level of an amount of drift corresponding to the logical block address, according to the heat of the data corresponding to the logical block address; different levels of the amount of drift correspond to different read voltages sent to the non-volatile memory device.

2. The memory system of claim 1, wherein the tables of the first class are obtained through a hash table; the tables of the second class are obtained through a Bloom filter, a Cuckoo filter, an XOR filter or a vacuum filter.

3. The memory system of claim 1, wherein the heat of the data includes: a hot data, a warm data, and a cold data; the average time difference between writing and reading which corresponds to the hot data, the warm data, and the cold data respectively becomes longer in sequence; the memory controller is configured to:
   when the data for the logical block address mapping is in the tables of the first class, determine that the data corresponding to the logical block address is the hot data or the warm data;
   when the data for the logical block address mapping is not in the tables of the first class, but in the tables of the second class, determine that the data corresponding to the logical block address is the warm data or the cold data; and
   when the data for the logical block address mapping is not in the tables of the first class nor the tables of the second class, determine that the data corresponding to the logical block address is the cold data.

4. The memory system of claim 3, wherein the number of tables of the first class includes two, and the number of tables of the second class includes two;
   the memory controller is configured to:
   when the data for the logical block address mapping is in the table of the first class for a previous first time interval, determine that the data corresponding to the logical block address is the hot data;
   when the data for the logical block address mapping is not in the table of the first class for the previous first time interval, but in the table of the first class for a current first time interval, determine that the data corresponding to the logical block address is the hot data or warm data;
   when the data for the logical block address mapping is not in the table of the first class for the current first time interval nor the table of the first class for the previous first time interval, but in the table of the second class for a previous second time interval, determine that the data corresponding to the logical block address is the warm data;
   when the data for the logical block address mapping is not in any of the table of the first class for the current first time interval, the table of the first class for the previous first time interval, or the table of the second class for the previous second time interval, but in the table of the second class for a current second time interval, determine that the data corresponding to the logical block address is the warm data or cold data; and
   when the data for the logical block address mapping is not in any of the table of the first class for the current first time interval, the table of the first class for the previous first time interval, or the table of the second class for the current second time interval, the table of the second class for the previous second time interval, determine that the data corresponding to the logical block address is the cold data.

5. The memory system of claim 3, wherein the number of tables of the first class includes two, and the number of tables of the second class includes two;

the memory controller is configured to:
  when the data for the logical block address mapping is in the table of the first class for a current first time interval or the table of the first class for a previous first time interval, determine that the data corresponding to the logical block address is the hot data;
  when the data for the logical block address mapping is not in the table of the first class for the current first time interval nor the table of the first class for the previous first time interval, but in the table of the second class for a current second time interval or the table of the second class for a previous second time interval, determine that the data corresponding to the logical block address is the warm data; and
  when the data for the logical block address mapping is not in any of the table of the first class for the current first time interval, the table of the first class for the previous first time interval, or the table of the second class for the current second time interval, the table of the second class for the previous second time interval, determine that the data corresponding to the logical block address is the cold data.

6. The memory system of claim 3, wherein the memory controller is further configured to:
  when the data corresponding to the logical block address is the hot data, determine that the amount of drift corresponding to the logical block address is a first level of the amount of drift;
  when the data corresponding to the logical block address is the warm data, determine that the amount of drift corresponding to the logical block address is a second level of the amount of drift; and
  when the data corresponding to the logical block address is the cold data, determine that the amount of drift corresponding to the logical block address is a third level of the amount of drift;
  wherein the first level of the amount of drift is less than the second level of the amount of drift, and the second level of the amount of drift is less than the third level of the amount of drift.

7. The memory system of claim 3, wherein the memory controller is configured to:
  when determining that the data corresponding to the logical block address is the warm data with the tables of the first class and the tables of the second class, and a failure for the reading of the data in a memory cell corresponding to the logical block address with the read voltage corresponding to the warm data occurs, reread the data in the memory cell corresponding to the logical block address with a read voltage corresponding to the cold data.

8. The memory system of claim 1, wherein the memory controller is further configured to:
  check whether the logical block address corresponding to the received read command is maintained in a write buffer;
  when the logical block address is not maintained in the write buffer, determine the level of the amount of drift corresponding to the logical block address; and
  send a read command to the non-volatile memory device according to the level of the amount of drift corresponding to the logical block address; wherein at least two of the checking whether the logical block address is maintained, the determining the level of the amount of drift, and the sending the read command are performed in parallel.

9. The memory system of claim 8, wherein the processes of checking whether the logical block address is maintained, determining the level of the amount of drift, and sending the read command are all performed in parallel; the memory controller includes: a first processor, a second processor, a third processor, a first on-chip memory, and a second on-chip memory; wherein,
  the first processor is configured to: check whether the logical block address corresponding to the received read command is maintained in the write buffer, and submit the logical block address to a first submission queue, if the logical block address is not maintained in the write buffer;
  the first on-chip memory is configured to: store the first submission queue;
  the second processor is configured to: determine the level of the amount of drift corresponding to each of the logical block addresses in the first submission queue, and submit the level of the amount of drift corresponding to each of the logical block addresses to a second submission queue;
  the second on-chip memory is configured to: store the second submission queue; and
  the third processor is configured to: send a read command to the non-volatile memory device according to the level of the amount of drift corresponding to each of the logical block addresses in the second submission queue;
  wherein at the same time, the logical block addresses corresponding to the first submission queue, the second submission queue and the sending the read command respectively are different.

10. The memory system of claim 9, wherein the third processor is configured to:
  determine a read voltage for performing a read command operation on the non-volatile memory device according to the level of the amount of drift corresponding to each of the logical block addresses in the second submission queue; and
  send the read command to the non-volatile memory device according to the read voltage for performing the read command operation on the non-volatile memory device.

11. The memory system of claim 10, wherein the first on-chip memory and the second on-chip memory both include a Dynamic Random Access Memory or a Static Random Access Memory.

12. The memory system of claim 1, wherein the memory system includes a storage class memory; and the non-volatile memory device includes a phase change memory.

13. A memory controller coupled to a non-volatile memory device and configured to:
  determine a heat of data corresponding to a logical block address of a received read command with tables of a first class and tables of a second class; the heat of the data represents a degree of length of average time difference between writing and reading of the data; the tables of the first class include a table of the first class, and the table of the first class is configured to store data for a logical block address mapping for each of first time intervals within a first preset time period after writing; the tables of the second class include a plurality of tables of the second class, the plurality of tables of the second class are configured to alternately store data for the logical block address mapping for each of second time intervals within a second preset time period after writing; the first preset time period is shorter than the second preset time period, and the first time interval is shorter than the second time interval; and determine a level of an amount of drift corresponding to the logical block address according to the heat of the data corresponding to the logical block address; different levels of the amount of drift correspond to different read voltages sent to the non-volatile memory device.

14. A method of operating a memory system, wherein the memory system includes: a non-volatile memory device, and a memory controller coupled to the non-volatile memory device, the method comprising:

determining a heat of data corresponding to a logical block address of a received read command with tables of a first class and tables of a second class; the heat of the data represents a degree of length of average time difference between writing and reading of the data; the tables of the first class include a table of the first class, and the table of the first class is configured to store data for a logical block address mapping for each of first time intervals within a first preset time period after writing; the tables of the second class include a plurality of tables of the second class, the plurality of tables of the second class are configured to alternately store data for the logical block address mapping for each of second time intervals within a second preset time period after writing; the first preset time period is shorter than the second preset time period, and the first time interval is shorter than the second time interval; and determining a level of an amount of drift corresponding to the logical block address according to the heat of the data corresponding to the logical block address; different levels of the amount of drift correspond to different read voltages sent to the non-volatile memory device.

15. The method of claim 14, further includes: forming the tables of the first class and the tables of the second class comprising:

storing, in the tables of the first class, data which are mapped through a mapping function in a hash table from the logical block addresses for each of the first time intervals within the first preset time period after writing; and storing, in the tables of the second class, data which are mapped through a mapping function in a Bloom filter, a Cuckoo filter, an XOR filter or a vacuum filter from the logical block addresses for each of the second time intervals within the second preset time period after writing.

16. The method of claim 14, wherein the heat of the data includes: hot data, warm data, and cold data; the average time difference between writing and reading which corresponds to the hot data, the warm data, and the cold data respectively becomes longer in sequence;

the determining the heat of the data corresponding to the logical block address of the received read command with the tables of the first class and the tables of the second class, includes:

when a group of data for the logical block address mapping is in the tables of the first class, determining that the data corresponding to the logical block address is the hot data or warm data;

when the group of data for the logical block address mapping is not in the tables of the first class, but in the tables of the second class, determining that the data corresponding to the logical block address is the warm data or cold data; and when the group of data for the logical block address mapping is not in the tables of the first class nor the tables of the second class, determining that the data corresponding to the logical block address is the cold data.

17. The method of claim 16, wherein the number of tables of the first class includes two, and the number of tables of the second class includes two;

the determining the heat of the data corresponding to the logical block address of the received read command with the tables of the first class and the tables of the second class, includes:

when the data for the logical block address mapping is in the table of the first class for a previous first time interval, determining that the data corresponding to the logical block address is the hot data;

when the data for the logical block address mapping is not in the table of the first class for the previous first time interval, but in the table of the first class for a current first time interval, determining that the data corresponding to the logical block address is the hot data or warm data;

when the data for the logical block address mapping is not in the table of the first class for the current first time interval nor the table of the first class for the previous first time interval, but in the table of the second class for a previous second time interval, determining that the data corresponding to the logical block address is the warm data;

when the data for the logical block address mapping is not in any of the table of the first class for the current first time interval, the table of the first class for the previous first time interval, or the table of the second class for the previous second time interval, but in the table of the second class for a current second time interval, determining that the data corresponding to the logical block address is the warm data or cold data; and when the data for the logical block address mapping is not in any of the table of the first class for the current first time interval, the table of the first class for the previous first time interval, or the table of the second class for the current second time interval, the table of the second class for the previous second time interval, determining that the data corresponding to the logical block address is the cold data.

18. The method of claim 16, wherein the number of tables of the first class includes two, and the number of tables of the second class includes two;

the determining the heat of the data corresponding to the logical block address of the received read command with the tables of the first class and the tables of the second class, includes:

when the group of data for the logical block address mapping is in the table of the first class for a current first time interval or the table of the first class for a previous first time interval, determining that the data corresponding to the logical block address is the hot data;

when the group of data for the logical block address mapping is not in the table of the first class for the current first time interval nor the table of the first class for the previous first time interval, but in the table of the second class for a current second time interval or the table of the second class for a previous second time interval, determining that the data corresponding to the logical block address is the warm data; and when the group of data for the logical block address mapping is not in any of the table of the first class for the current first time interval, the table of the first class for the previous first time interval, or the table of the second class for the current second time interval, the table of the second class for the previous second time interval, determining that the data corresponding to the logical block address is the cold data.

19. The method of claim 16, wherein the determining a level of the amount of drift corresponding to the logical block address according to the heat of the data corresponding to the logical block address includes:

when the data corresponding to the logical block address is the hot data, determining that the amount of drift corresponding to the logical block address is a first level of the amount of drift;

when the data corresponding to the logical block address is the warm data, determining that the amount of drift corresponding to the logical block address is a second level of the amount of drift; and when the data corresponding to the logical block address is the cold data, determining that the amount of drift corresponding to the logical block address is a third level of the amount of drift;

wherein the first level of the amount of drift is less than the second level of the amount of drift, and the second level of the amount of drift is less than the third level of the amount of drift.

20. The method of claim 16, further includes:

when determining that the data corresponding to the logical block address is the warm data with the tables of the first class and the tables of the second class, and a failure for the reading of the data in a memory cell corresponding to the logical block address with a read voltage corresponding to the warm data occurs, rereading the data in the memory cell corresponding to the logical block address with a read voltage corresponding to the cold data.

* * * * *